United States Patent
Clidence

(10) Patent No.: US 9,181,106 B2
(45) Date of Patent: Nov. 10, 2015

(54) SYSTEMS AND METHODS FOR CONTROL OF A GAS OR CHEMICAL

(75) Inventor: David A Clidence, Carmel, IN (US)

(73) Assignee: Eco Oxygen Technologies, LLC, Indianapolis, IN (US)

( * ) Notice: Subject to any disclaimer, the term of this patent is extended or adjusted under 35 U.S.C. 154(b) by 347 days.

(21) Appl. No.: 13/703,221

(22) PCT Filed: Jun. 8, 2011

(86) PCT No.: PCT/US2011/039666
§ 371 (c)(1),
(2), (4) Date: Dec. 10, 2012

(87) PCT Pub. No.: WO2011/156517
PCT Pub. Date: Dec. 15, 2011

(65) Prior Publication Data
US 2013/0082006 A1    Apr. 4, 2013

Related U.S. Application Data

(60) Provisional application No. 61/352,652, filed on Jun. 8, 2010.

(51) Int. Cl.
| | |
|---|---|
| C02F 1/00 | (2006.01) |
| B01D 21/24 | (2006.01) |
| G05D 7/00 | (2006.01) |
| B01F 3/04 | (2006.01) |
| B01F 5/06 | (2006.01) |
| B01F 5/10 | (2006.01) |
| C02F 1/72 | (2006.01) |

(52) U.S. Cl.
CPC ............. *C02F 1/008* (2013.01); *B01F 3/04496* (2013.01); *B01F 5/0653* (2013.01); *B01F 5/106* (2013.01); *C02F 1/727* (2013.01); *B01F 2003/04879* (2013.01); *C02F 2209/006* (2013.01); *C02F 2209/22* (2013.01)

(58) Field of Classification Search
None
See application file for complete search history.

(56) References Cited

U.S. PATENT DOCUMENTS

| | | | |
|---|---|---|---|
| 6,749,743 | B1 | 6/2004 | Rohrer et al. |
| 2002/0070163 | A1 | 6/2002 | Lambert |
| 2006/0231500 | A1 | 10/2006 | Speece et al. |
| 2008/0135493 | A1 | 6/2008 | Clidence et al. |

OTHER PUBLICATIONS

Written Opinion of the International Searching Authority and International Search Report.

*Primary Examiner* — Nam Nguyen
*Assistant Examiner* — Richard Gurtowski
(74) *Attorney, Agent, or Firm* — Ice Miller LLP

(57) ABSTRACT

A system and method for control of a gas or chemical. In one embodiment, the system comprises an oxygenator for receipt of wastewater and oxygen for dissolving, mixing, diffusing, or infusing the oxygen into the wastewater, and a recirculation mechanism configured to increase the flow rate in the oxygenator and/or level of oxygen dissolved in the wastewater.

16 Claims, 14 Drawing Sheets

SYSTEMS AND METHODS FOR CONTROL OF A GAS OR CHEMICAL

PRIORITY

The present application is related to, and claims the priority benefit of, International Patent Application Serial No. PCT/US2011/039666, filed Jun. 8, 2011, which is related to, and claims the priority benefit of U.S. Provisional Patent Application Ser. No. 61/352,652, filed Jun. 8, 2010. The contents of each of these applications are hereby incorporated by reference in their entirety into this disclosure.

BACKGROUND

This present disclosure relates to the field of fluid treatment, and particularly to the introduction of a gas and/or chemical to the fluid to be treated.

Raw domestic wastewater commonly generates offensive odors, especially at warmer temperatures, in collection systems and primary clarifiers at the wastewater treatment plant, combined sewer overflows, storage tanks, lagoons, and effluents in a sewage system. The reason for generation of offensive odors is that the demand for dissolved oxygen by the microbes in the wastewater greatly exceeds the rate that dissolved oxygen is absorbed into the wastewater. The main odor source at a municipal wastewater treatment plant is the effluent of the primary clarifier. This is because the raw wastewater resides in the primary clarifier for over 1 to 4 hours under anaerobic conditions. Under these anaerobic conditions, the microbes reduce sulfate to sulfide which causes the offensive odors. Thus, when the effluent spills down the 2 to 24 inches over the effluent weirs, the hydrogen sulfide is readily stripped out of solution. Consequently, many municipalities cover their primary clarifiers, pull off the foul off gas and scrub it of the offensive odors. This solution results in high capital cost, as well as high operating costs.

Even though it is widely recognized that oxygen deficiency in the wastewater is the root cause of the malodorous and corrosive condition, providing sufficient dissolved oxygen has not been possible, because the rags and stringy material in the raw wastewater quickly plug conventional gas transfer equipment. Furthermore, the low oxygen content in air (21%) makes it impossible to raise the dissolved oxygen above 9 mg per liter in wastewater at 25° C. Furthermore, conventional aeration systems are very efficient at stripping out the volatile offensive sulfide complements. For instance, coarse bubble aerators generate 99 ft.$^3$ of off gas for each 1 ft.$^3$ of oxygen dissolved at 5% oxygen absorbed efficiency characteristic of coarse bubble aerators. Surface aerators have even greater stripping potential for sulfide. Therefore, these conventional systems cannot be used to aerate raw domestic wastewater without exacerbating the odors.

In order to prevent odor and corrosion in collection and primary clarifiers, it has been found that wastewater should be superoxygenated from about 10 mg per liter to about 60 mg per liter or higher of dissolved oxygen. There is a widespread myth that (1) it is not possible to achieve such high dissolved oxygen concentrations in raw municipal wastewater, and (2) that if such levels were achieved, they would quickly effervesce out of solution from the wastewater. High purity oxygen ("HPO") has a water saturation concentration about five times that of air (40 mg per liter at 25° C.). Furthermore, HPO is expensive, and economic considerations make it preferable to utilize an oxygen dissolving system that is highly efficient and has low unit energy consumption per ton of dissolved oxygen.

Thus, large cities in the United States and elsewhere spend considerable amounts of money for odor/corrosion control chemicals. For example, Los Angeles County spends nearly twenty (20) million dollars per year on the chemicals alone. Orange County California spends about 2.5 million dollars per year for odor control chemicals such as peroxide and nitrate. Some cities inject gaseous high purity oxygen into force mains, but the low efficiency of oxygen absorption considerably increases the total cost, as well as presents an explosion hazard, because the high purity oxygen bubbles immediately rise out of the wastewater and the high purity oxygen travels along the crown of the sewer and then collects at the first high point when the grade of the pipe becomes negative. This gas space also increases the head on the pump moving water through the system. Therefore, a high efficiency method and apparatus for superoxygenating raw wastewater would be beneficial.

Oxygenation has long been recognized as potentially attractive in wastewater operations. However, to make an oxygenation system economically competitive, there should be commensurate savings in energy costs for dissolving the oxygen to offset the costs for the HPO supply. Early oxygenation systems were not able to achieve significant energy reductions for they consumed about half the energy needed to dissolve a unit of oxygen compared to conventional aeration systems.

Municipal wastewater treatment plants themselves can generate offensive odors—with $H_2S$ and mercaptans being perhaps the worst offenders. Odor studies identify the effluent weirs from the primary clarifier as the major source of odor generation for municipal wastewater treatment plants. The root cause for the odor lies in the long detention times of raw wastewater and sludge in the primary clarifier in the absence of D.O.

One prior art approach taken to mitigate such offensive odors at the municipal wastewater treatment plan is to cover the primary clarifier weirs, where the odor is stripped from the primary effluent as it cascades over the effluent weirs, and to withdraw the gas under the cover through ductwork and a blower. This withdrawn gas then must be passed through a caustic chlorine scrubber or biofilter where the odor is oxidized and destroyed. Treatment of the offensive gas in this manner is costly in terms of capital cost as well as the operating costs for caustic and chlorine. Because $H_2S$ is so corrosive the cover and ductwork must be made of corrosion proof material.

Another common approach to mitigating the odor at a wastewater treatment plant is to capture and treat the offensive gases so formed. However, the use of covers on the clarifier or weirs also significantly hinder maintenance. Furthermore, every pound of oxygen consumed in the primary clarifier translates to a 1:1 corresponding reduction of oxygen demand in the aeration tank. Therefore, it is desired to provide an efficient, cost effective system for removal of odors at municipal wastewater treatment plants and at clarifiers.

A major effort is underway in many cities to collect, store and treat combined sewer overflows (CSO). Such systems generally involve the collection of a relatively large volume of CSO in a short period of time and then storing the collected CSO for a protracted period of time—a period of days to weeks—while it is pumped out through a municipal wastewater treatment plant during low flow periods. The very nature of CSO is that it can be significantly polluted in the initial "flush" with BOD concentrations of 50 to over 200 mg/L.

The challenge to meet this oxygen demand for collected CSO is significant with present aeration systems. Further, some particular design considerations emerge. Aeration does not economically permit D.O. increases above 2 to 4 mg/L. In one large Midwestern city, the proposed aeration system designed to keep the stored CSO aerobic consumed from 2000 to 4000 kwhr/ton of $O_2$ dissolved under the most frequently occurring storage event. Furthermore, the electrical demand charge for the compressors to be turned on for a 30-minute interval twice per year alone is excessive.

If a storage basin receives a CSO storm event flow containing a BOD of 100 mg/L which has a deoxygenation constant, $k_1$, of 0.1 per day. The D.O. uptake for the first day in this case is 21 mg/L. Because the first day is the highest rate, it establishes the design criteria for sizing the required oxygen transfer system. For a storage basin of 100 MG, the system would require approximately a 700 HP blower for coarse bubble aeration to meet this demand. Therefore, it is desired to provide an aeration system for use with collected CSOs that does not require significant capital investment to achieve appropriate levels of D.O.

Wastewater treatment lagoons commonly are utilized for treatment of industrial and intensive animal rearing wastewaters. However, because these lagoons are commonly anaerobic and generate considerable $H_2S$, it is not unusual to require $1,000,000 to put a cover on such lagoons and treat the off-gas to mitigate odor generation.

Traditionally, aeration systems have been designed to satisfy activated sludge and aerated lagoon D.O. uptake rates of 20 to 80 mg/L-hr. The development of some of the more advanced aerobic treatment systems which use advanced cell immobilization techniques are capable of ten-fold increases in biomass concentrations. Only a properly designed oxygenation system can meet the exceptionally high oxygen uptake rates of 300 to 500 mg/L-hr inherent in these advanced aerobic processes. It is desired to provide such an oxygenation system.

Regulations requiring that treated effluents be discharged at elevated D.O. concentrations to their receiving waters are specified in some discharge permits. Conventional aeration techniques can achieve this, but do so with by requiring prohibitively high unit energy consumption and are also limited in the D.O. that can be achieved. To increase the D.O. from 0 to 7 mg/L in water at 25° C. requires approximately 2700 kwhr/ton of D.O. added using standard aeration equipment. This is equivalent to over $200/ton of D.O. for electricity rates of $0.08/kwhr. It is therefore desired to provide an aeration system that can be utilized to treat effluents to regulated levels in an energy efficient manner.

In systems where a gas and/or chemical is to be used to treat a fluid, such as in a wastewater treatment system using dissolved oxygen to treat the wastewater, it is desirable to control the amount of fluid to be treated and the amount of gas and/or chemical to be used for such treatment. Generally, such systems are designed and operated assuming static conditions. However, in many applications, the conditions are not static. When treating wastewater near a gravity force main, for example, the amount of wastewater flowing through the sewer lines, and hence to be treated, varies significantly due to numerous factors. Therefore, it is desired to provide a system and method for treatment of a fluid with a gas and/or chemical that can accommodate the dynamic conditions associated with the application.

BRIEF SUMMARY

The present disclosure comprises systems and methods for treating fluids, such as wastewater. In at least one embodiment of a wastewater treatment system of the present disclosure, the wastewater treatment system comprises (1) a wastewater inlet for receipt and flow of wastewater therethrough, the wastewater inlet having a first end and a second end, the first end of the wastewater inlet configured for fluid communication with a wastewater source, (2) a wastewater outlet for flow and discharge of oxygenated wastewater therethrough, the wastewater outlet having a first end and a second end, the second end of the wastewater outlet configured for fluid communication with the wastewater source, (3) an oxygen source, (4) an oxygenator operably coupled to the oxygen source to permit oxygen from the oxygen source to be introduced to the oxygenator, the oxygenator comprising an oxygenator inlet, an oxygenator outlet, and a container, wherein the container comprises an inverse conically shaped portion configured to have a first end tapering towards a larger second end, the inlet of the oxygenator operably connected to the second end of the wastewater inlet and the first end of the container, the outlet of the oxygenator operably connected to the first end of the wastewater outlet and the second end of the container, wherein when the wastewater flows through and is oxygenated by the oxygenator, a level of dissolved oxygen in the oxygenated wastewater increases, and (5) a recirculation mechanism comprising a recirculation channel fluidly coupled to the wastewater inlet and the wastewater outlet, wherein the recirculation channel is configured to allow oxygenated wastewater to pass therethrough.

In at least one embodiment of a wastewater treatment system of the present disclosure, the recirculation mechanism further comprises at least one recirculation valve operably coupled to the recirculation channel, the at least one recirculation valve capable of preventing oxygenated wastewater from flowing through the recirculation channel. Additionally, the recirculation mechanism may also comprise a recirculation pump coupled to the recirculation channel, where the pump is operable to draw oxygenated wastewater through the recirculation channel. Further, an exemplary embodiment of the wastewater treatment system may further comprise a controller operably connected to the recirculation mechanism and capable of altering the flow of oxygenated wastewater through the recirculation mechanism. The controller may also be connected to the oxygen source and the oxygenator, the controller capable of altering the level of oxygen delivered to the oxygenator.

In at least one embodiment of a wastewater system of the present disclosure, or a method of use thereof, the recirculation mechanism may be operable to provide a quantity of oxygenated wastewater to the oxygenator. Additionally, an exemplary embodiment of the recirculation mechanism may be operable to increase a flow rate of wastewater into the oxygenator, such as by delivery to the wastewater inlet. Further, an embodiment of the recirculation mechanism may be operable to increase an oxygen transfer efficiency by the system.

In at least one embodiment of a wastewater treatment system of the present disclosure, the oxygenator is configured to be operable to convert wastewater introduced to the oxygenator through the oxygenator inlet into oxygenated wastewater containing a level of oxygen selected from the group consisting of at least about 1 mg/L, at least about 2 mg/L, at least about 4 mg/L, at least about 6 mg/L, at least about 8 mg/L, at least about 10 mg/L, at least about 20 mg/L, at least about 50 mg/L, at least about 100 mg/L, at least about 150 mg/L, at least about 200 mg/L, at least about 250 mg/L, and at least about 300 mg/L of dissolved oxygen. Further, in at least one embodiment of the wastewater treatment system of the present disclosure, the oxygenator is configured to be operable to cause an oxygen level to be dissolved into the oxygenated wastewater, wherein the oxygen level is selected from the group consisting of at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 92%, at least about 94%, at least about 96%, at least about 98%, and at least about 99% of the oxygen.

Moreover, in at least one embodiment of the wastewater treatment system, the oxygen source may be operably connected to the wastewater inlet between the first and second ends of the wastewater inlet, wherein when oxygen is supplied to the wastewater inlet the oxygen flows into the oxygenator.

In at least one embodiment of a method for treating wastewater of the present disclosure, the method comprises the steps of providing a system which includes (1) a wastewater inlet for receipt and flow of wastewater therethrough, the wastewater inlet having a first end and a second end, the first end of the wastewater inlet configured for fluid communication with a wastewater source, (2) a wastewater outlet for flow and discharge of oxygenated wastewater therethrough, the wastewater outlet having a first end and a second end, the second end of the wastewater outlet configured for fluid communication with the wastewater source, (3) an oxygen source, (4) an oxygenator operably coupled to the oxygen source to permit oxygen from the oxygen source to be introduced to the oxygenator, the oxygenator comprising an oxygenator inlet, an oxygenator outlet, and a container, the container comprising an inverse conically shaped portion configured to have a first end tapering towards a larger second end, the oxygenator inlet operably connected to the second end of the wastewater inlet and the first end of the container, the oxygenator outlet operably connected to the first end of the wastewater outlet and the second end of the container, wherein when the wastewater flows through and is oxygenated by the oxygenator, a level of dissolved oxygen in the oxygenated wastewater increases, (5) a recirculation mechanism comprising a recirculation channel fluidly coupled to the wastewater inlet and the wastewater outlet, wherein the recirculation channel is configured to allow oxygenated wastewater to pass therethrough, and (6) a controller operably connected to the oxygenator and the recirculation mechanism, the controller capable of altering the flow of oxygenated wastewater through the recirculation mechanism, introducing wastewater into the system through the wastewater inlet and oxygen into the system from the oxygen source, and recirculating oxygenated wastewater from the wastewater outlet to the wastewater inlet through the recirculation mechanism.

In at least one embodiment of a method for treating wastewater of the present disclosure, the method further comprises the steps of adjusting, under the control of the controller, the amount of oxygen introduced into the oxygenator in response to the amount of oxygen measured as present in the oxygenated wastewater, wherein the controller is operably connected to the oxygen source, the wastewater outlet, and the oxygenator. Optionally, the recirculation mechanism may further comprise one or more of (1) at least one recirculation valve operably coupled to the recirculation channel, the at least one recirculation valve capable of preventing oxygenated wastewater from flowing through the recirculation channel, and (2) a recirculation pump coupled to the recirculation channel, the pump operable to draw oxygenated wastewater through the recirculation channel.

In at least one embodiment of the oxygenator of the present disclosure, the oxygenator may be configured to be operable to convert wastewater introduced to the oxygenator through the oxygenator inlet into oxygenated wastewater containing at least about 1 mg/L, at least about 2 mg/L, at least about 4 mg/L, at least about 6 mg/L, at least about 8 mg/L, at least about 10 mg/L, at least about 20 mg/L, at least about 50 mg/L, at least about 100 mg/L, at least about 150 mg/L, at least about 200 mg/L, at least about 250 mg/L, and at least about 300 mg/L of dissolved oxygen. Further, the oxygenator may be configured to be operable to cause an oxygen level to be dissolved into the oxygenated wastewater, wherein the oxygen level is selected from the group consisting of at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, at least about 92%, at least about 94%, at least about 96%, at least about 98%, and at least about 99% of the oxygen.

In at least one embodiment of a method for treating wastewater of the present disclosure, the method further comprises the steps of (1) establishing a desired range for flow of wastewater into the oxygenator, (2) measuring with the controller the amount of wastewater entering the oxygenator, (3) comparing with the controller the measured amount of wastewater entering into the oxygenator to the desired range, and (4) if the controller determines in the step of comparing the measured amount that the measured amount is outside the desired range, the controller adjusts the introduction of wastewater into the oxygenator by adjusting the flow rate of the recirculation mechanism.

In at least one embodiment of the system of the present disclosure, the system may further comprise a monitoring device capable of measuring the level of oxygen in the oxygenated wastewater, the monitoring device coupled to the oxygenator outlet and operably connected to the controller, the method further comprising the steps of (1) establishing the desired range for the level of oxygen in the oxygenated wastewater, (2) measuring with the monitoring device the level of oxygen in the oxygenated wastewater, (3) comparing with the controller the measured level of oxygen in the oxygenated wastewater to the desired range, and (4) if the controller determines that the measure level of oxygen in the oxygenated wastewater is outside the desired range, the controller adjusts the amount of wastewater entering the oxygenator through the wastewater inlet, the flow rate of oxygenated wastewater through the recirculation channel, and/or the amount treated fluid flowing from the oxygenator at the outlet.

In at least one embodiment of the system of the present disclosure, the system may further comprise at least one device for collection of data related to the operation of the system and including a data storage mechanism for the data collected by the at least one device, the method further comprising the step of collecting in the data storage mechanism of the controller data collected by the at least one device during operation of the system.

BRIEF DESCRIPTION OF THE DRAWINGS

The above-mentioned embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION

Figure 1:
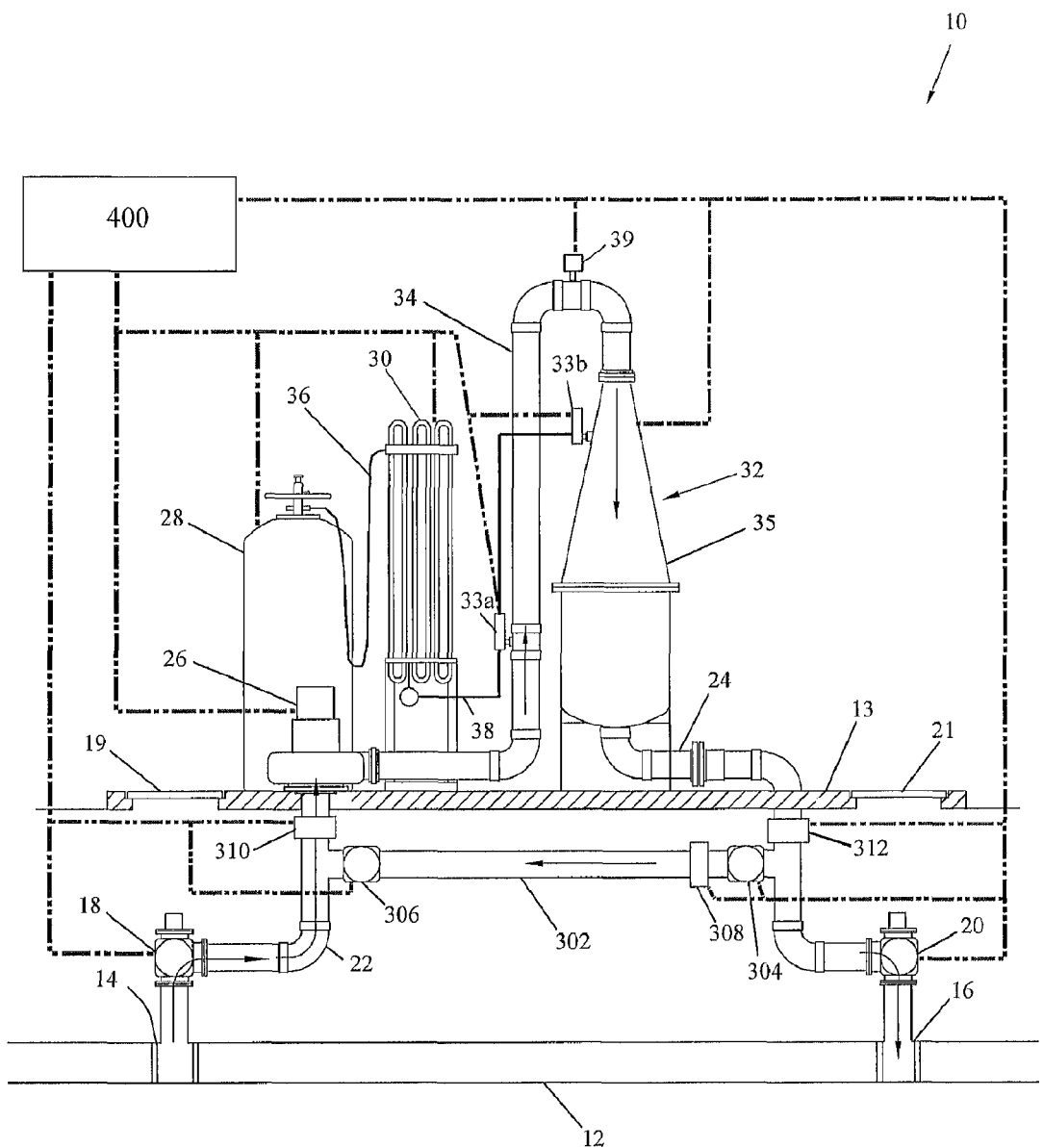
FIG. 1 shows a schematic view of at least embodiment of the wastewater treatment system according to the present disclosure.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Exemplary embodiments of the present disclosure relate to systems (or apparatus) and methods that allows municipal waste treatment facilities to inhibit corrosive and malodorous chemicals from forming in its gravity collection systems, force main sewers, primary clarifiers, or combined sewage overflows in a sewage system by readily superoxygenating the wastewater to effective levels. In particular, embodiments of the present disclosure utilize a down flow bubble contact oxygenator, which has no internal edges, corners or cracks to snag rags and strings and plug the system. In one embodiment, the down flow bubble contact oxygenator, substantially similar to that disclosed in this inventor's U.S. Pat. No. 3,643,403 that is hereby incorporated by reference, is used to pump raw municipal wastewater through it, along with gaseous $O_2$ injection into the chamber to superoxygenate it to 10 mg per liter of dissolved oxygen or higher. In particular, the down flow bubble contact oxygenator is utilized in gravity sewers, force main sewers, primary clarifiers, or combined sewage overflows in a sewage system to superoxygenate wastewater.

According to the present disclosure, oxygen is completely or substantially dissolved in the wastewater in the discharge of the down flow bubble contact oxygenator and is then piped back into the sewage system. For example, by use of embodiments of the present disclosure with a six-foot by six-foot square sewer flowing 5 ft. deep, the wastewater can be superoxygenated to 30 mg per liter dissolved oxygen, and only lose about 3 mg per liter of dissolved oxygen after flowing 3 miles in a gravity sewer due to gas exchange at the surface. Since the oxygen is in the dissolved state in the discharge of the down flow bubble contact oxygenator, there are no gaseous bubbles to come out of solution once the water is returned to the collection system or pumped into the primary clarifier. Thus, any hydrogen sulfide flowing into the superoxygenated section is microbially oxidized to sulfate in about 15 to 30 minutes once the wastewater has a positive dissolved oxygen, and no further sulfide production occurs in this three-mile stretch because the dissolved oxygen prevents any further sulfate reduction to hydrogen sulfide.

Wastewater in the interceptors flowing into the head works of a wastewater treatment plant superoxygenated in the manner described above eliminate the great odor and corrosion problems experienced at most wastewater treatment plants due to hydrogen sulfide in the incoming wastewater. Advantages are also realized in other applications of the system of the present disclosure at various locations in the sewage system.

Embodiments of systems and methods of the present disclosure result in diminishing or precluding the formation of corrosive and odorous gas at a lower cost (capital investment and energy). There are also additional benefits to the use of this superoxygenating system according to the present disclosure. For example, each pound of dissolved oxygen added to the stream of sewage by the system results in 1 lb. of dissolved oxygen saved in secondary treatment. Thus, corrosion control is achieved for no net overall increase in dissolved oxygen as required in secondary treatment. Another significant advantage of the system utilizing the down flow bubble contact oxygenator is the high efficiency of dissolving oxygen results in no off gas stripping of any volatile components in the wastewater. Thus, wastewater containing high concentrations of hydrogen sulfide can be superoxygenated without exacerbating the odor corrosion problem, by stripping it out of solution. Additionally, under the conditions created under the use of this system, there is no need to cover the holding tanks because there is no hydrogen sulfide in the discharge of this toxic wastewater.

Use of a down flow bubble contact aeration apparatus to superoxygenate wastewater in a sewage system, superoxygenates the water to a level which precludes the formation of malodorous and corrosive gases and chemicals. In particular, the use of a down flow bubble contact oxygenator allows superoxygenation of wastewater to an extent not possible under the prior art, greatly reducing stripping of gases and similarly resisting clogging by rags and string endemic to raw wastewater.

Referring now to FIG. 1, there is shown a schematic view of at least one embodiment of the wastewater treatment system of the present disclosure. As shown in an exemplary embodiment, main sewage line 12 may be disposed below ground. System 10 may be disposed above or below main sewage line 12. In an embodiment of FIG. 1, system 10 is above platform 13 as would be case in use with a primary clarifier, for example. If system 10 were used with a gravity sewer, system 10 intake and discharge would be below main sewage line 12. First and second sewer connections 14 and 16, respectively, each comprise an aperture and are made to permit sewage flow to and from system 10. First valve 18 is disposed at first sewer connection 14, and second valve 20 is disposed at second sewer connection 16. First and second valves 18 and 20 may be accessible through first and second manhole covers 19 and 21, respectively, on platform 13.

Both first valve 18 and second valve 20 may be variable valves which are movable between an open position and a closed position. When first valve 18 is in the closed position, all sewage entering first sewer connection 14 is caused to flow through main sewage line 12. When first valve 18 is in the open position, a portion of sewage entering first sewer connection 14 is permitted to flow through system inlet 22. When second valve 20 is in the closed position, any sewage residing in system outlet 24 is not permitted to enter into main sewage line 12. When second valve 20 is in the open position, any sewage residing in system outlet 24 is permitted to enter into sewage line 12.

In at least one exemplary embodiment of the system of the present disclosure, system 10 includes system inlet 22, pump 26, liquid oxygen tank 28, evaporator 30, oxygenator 32, system outlet 24, liquid oxygen connector 36, oxygen gas connector 38, and oxygenator inlet 34. System inlet 22 is connected at its first end to first valve 18, and at its second end to pump 26. Pump 26 is operable to "pull" sewage from system inlet 22 into oxygenator inlet 34. Liquid oxygen tank 28 houses liquid oxygen and evaporator 30 converts liquid oxygen into oxygen gas. Liquid oxygen connector 36 is connected at its first end to liquid oxygen tank 28 and at is second end to evaporator 30. Oxygen gas connector 38 is connected at its first end to evaporator 30 and at its second end to oxygen inlet 33a along oxygenator inlet 34. Oxygenator inlet 34 is connected at its first end to pump 26 and at its second end at oxygenator 32. Alternatively, oxygen gas connector may be connected to an oxygen generating system, as is known in the art. Further, oxygen gas connector 38 may be connected to oxygen inlet 33b, in addition to, or in place of, oxygen inlet 33a. While in an exemplary embodiment depicted in FIG. 1, oxygen inlet 33b is coupled to conical portion 35 of oxygenator 32, it will be appreciated that oxygen inlet 33b may be connected at alternate sites on oxygenator 32 and still allow for oxygenation of the liquid flowing through the oxygenator.

In at least one embodiment of the present disclosure, oxygenator 32 is of the shape disclosed in U.S. Pat. No. 3,643,403. Oxygen may or may not be directly inserted within the interior of oxygenator 32. In at least one alternative for introduction of oxygen directly into the oxygenator, oxygen is injected through oxygen inlet 33a into oxygenator inlet 34 and then into oxygenator 32. However, like the embodiments illustrated in U.S. Pat. No. 3,643,403, oxygenator 32 comprises a flow chamber of uniformly increasing flow area in a downward direction, i.e., comprises conical portion 35. Oxygenator 32 may, or may not, include a power operator impeller means as disclosed in U.S. Pat. No. 3,643,403.

During operation of an embodiment of system 10, first and second valves 18 and 20, respectively, are placed in the open position to allow a portion of sewage entering main sewage line 12 at first sewer connection 14 to enter system 10 and then to rejoin main sewage line 12 at second sewer connection 16. Pump 26 is operated to "pull" the portion of sewage entering through first valve 18 through system inlet 22 and to push the portion of sewage into oxygenator inlet 34. Liquid oxygen is allowed to flow (due to the pressure in liquid oxygen tank 28) from liquid oxygen tank 28 through liquid oxygen connector 36 into evaporator 30. At evaporator 30, the liquid oxygen is converted to oxygen gas and allowed to flow (due to the pressure in liquid oxygen tank 28) through oxygen gas connector 38 into oxygenator inlet 34 via oxygen inlet 33.

From the point of oxygen inlet 33a to oxygenator 32 along oxygenator inlet 34, oxygen gas injected at the oxygen inlet mixes with the sewage flowing through oxygenator inlet 34. The mixture of sewage and oxygen gas enters oxygenator 32. At oxygenator 32, the bubbles of oxygen gas mixed with the sewage are drawn downward toward the bottom of oxygenator 32 and system outlet 24. Thus, the mixture of sewage flowing through system outlet 24 and second valve 20 into main sewage line 12 at second sewer connection 16 is "super-oxygenated." At second sewer connection 16, the superoxygenated mixture joins the portion of sewage that was not drawn into system 10 to oxygenate the entire sewage flowing away from system 10.

It will be appreciated that the source of oxygen gas inserted into oxygenator input 34 need not be from liquid oxygen. Instead, oxygen gas, having a higher relative concentration than that of atmospheric air, itself may be used and be within the scope of the disclosure. For example, the combination of liquid oxygen tank 27, liquid oxygen connector 36, evaporator 30, and oxygen gas connector 38 may be replaced with a tank of oxygen gas and a connector going from the tank of oxygen gas and oxygen inlet 33. Alternately, any known mechanism of oxygen gas generation may be coupled to oxygen gas connector 38, so as to provide oxygen gas to oxygenator 32.

Further, it will be appreciated that diurnal flow pattern of wastewater conveyance systems varies significantly throughout the day, and as such may influence the flow rate available to system 10. Given that a minimum side stream flow rate through oxygenator 32 is required to maintain the critical design velocities at the inlet and discharge of oxygenator 32, it is desirable to reduce the minimal flow rate required for operation. Previously, should the flow rate in the force main drop below a minimum flow rate required for the oxygenator 32, the system would be shut down. This action reduced the operating time of the system and therefore reduced the system's daily capacity to dissolve oxygen. Furthermore, at times when there is no flow in the force main and the system is shut down, residual oxygen that is inside the cone at the time of shut down, may need to be vented by means of a release valve 39, which may be located on the inlet pipe to the cone. This loss in oxygen further reduces the oxygen transfer efficiency of the system 10.

In at least one embodiment of system 10 of the present disclosure, liquid flowing out of system outlet 24 may be returned to an area of system 10 prior to the exit of oxygenator 32. By "recirculating" the oxygenated liquid, the required level of new liquid from main sewer ling 12 to maintain the operation of system 10 drops below that previous used. In an exemplary embodiment of a recirculating system 10, the system contains a recirculation channel 302, which is fluidly connected to system outlet 24 between the outlet of oxygenator 32 and second valve 20. The other end of recirculation channel 302 is fluidly connected to system inlet 22 between first valve 18 and pump 26. Recirculation channel 302 may comprise a first recirculation valve 304 and optionally a second recirculation valve 306, each of which is operable when in the closed position to prevent fluid flow through recirculation channel 302. In an exemplary embodiment, valves 304 and 306 may be positioned at opposite ends of recirculation channel 302. Therefore, when second valve 20 is closed, and the recirculation valves (304 and 306 if present) are open, oxygenated liquid flowing from system outlet 24 will be shunted towards system inlet 22. Additional embodiments of system 10 may have recirculation channel 302 coupled to additional components of system 10, instead of system inlet 22. For example, recirculation channel 302 may be attached to system outlet 24 (as depicted in FIG. 1), but also fluidly coupled to either oxygenator inlet 34, or to oxygenator 32.

In an exemplary embodiment of system 10, the inclusion of recirculation channel 302 allows system 10 to operate during low flow periods, where the flow rate would otherwise require system 10 to shut off. This increase in daily operational time may translate into an increase in the systems daily capacity to dissolved oxygen. Further, the recirculation allowed by recirculation channel 302 may be used to further dissolve residual oxygen inside the oxygenator 32 by allowing the side stream pump to continue to operate for a set period of time before shutting down. In at least one embodiment, this recirculation action further increases oxygen transfer efficiency of system 10.

To increase the flow of liquid through recirculation channel 302 towards system inlet 22, a recirculation pump 308 may also be operably coupled to recirculation channel 302 so as to "push" the oxygenated liquid through recirculation channel 302 and towards system inlet 22. Further, in at least one embodiment, system 10 may also comprise a third valve 310 and a fourth valve 312. Third valve 310 may be present in an exemplary embodiment between the connection of recirculation channel 302 to system inlet 22 and pump 26. Fourth valve 312 may be present in an exemplary embodiment between the outlet of oxygenator 32 and the junction of system outlet 24 with recirculation channel 302. Each of third valve 310 and fourth valve 312 are operable to block fluid flow therethrough when in the closed position.

In at least one embodiment of system 10, system 10 may also comprise a controller 400, which is operable to adjust the flow of liquid entering and exiting system 10, and the process of oxygenation of said liquid. To achieve this level of control, controller 400 may be connected to, and operable to control, any adjustable component of system 10. For example, in an exemplary embodiment, controller may be connected to first and second valves 18 and 20, pump 26, oxygen tank 28, evaporator 30, oxygen inlets 33a and 33b, oxygenator 32, release valve 39, third and fourth valves 310 and 312, first and second recirculation valves 304 and 306. Further, controller 400 may be coupled (as depicted by dashed lines in FIG. 1) to various sensors as described herein (such as those included in FIG. 2).

It will also be appreciated that the embodiments of the system of the present disclosure may be useful in a variety of applications in a sewage system. While the embodiment of FIG. 1 illustrates an exemplary embodiment of the system used with a gravity main, the system may also be used with wastewater treatment plants, force main sewers, clarifiers, and combined sewer overflows prior to discharge into receiving waters, such as rivers.

It will be further appreciated that the system of the present disclosure may be used in the main sewage stream. An alternate embodiment of the present disclosure introduces the oxygen directly into the main stream rather than a sidestream as illustrated in FIG. 1.

Exemplary embodiments of the present disclosure may result in efficient dissolution of HPO into raw sewage. The performance of the oxygenation system is, of course, related to the pressure in the superoxygenation transfer vessel, which in FIG. 1 comprises oxygenator 32. For example, a backpressure of 15 psig would permit 100% $O_2$ absorption in the oxygenation system while producing a discharge D.O. of approximately 50 mg/L. The corresponding maximum discharge D.O. for a backpressure of 45 psig would be 150 mg/L. For example, a 6 ft×6 ft sewer flowing 5 ft deep at 3 ft/sec has a reaeration rate ($k_2$) of about 10/day. Therefore, if the D.O. is raised to 30 mg/L, it can be 86% retained over 3 miles and the head space oxygen content will only rise to a maximum of 22.5% $O_2$.

Superoxygenation by use of the present disclosure with primary clarifier influents provides a major advance in odor mitigation technology. The method of prevention of $H_2S$ formation by use of the system of the present disclosure is a much more comprehensive solution to municipal and industrial wastewater treatment plant odors than is gas scrubbing of the $H_2S$ after it is formed or collection of the gas after it is formed.

With regard to combined sewer overflows, oxygenation by use of the present disclosure is considerably more cost effective than prior art aeration systems. In addition, there are some noteworthy design objectives which can only be achieved with oxygenation by the present disclosure. Liquid oxygen stored on-site can be utilized to meet the exceptionally high initial oxygen demand of a storm event. Oxygenation by the present disclosure makes it possible to increase the D.O. in the incoming flows to over 50 mg/L. Since the rate of exchange of a dissolved gas at the interface ($k_2$) of a storage basin is related to the velocity of the water and wind and inversely proportional to the depth, very little of the superoxygenated D.O. is lost in a stagnant storage basin containing over 10 ft of water. Thus, the super oxygenated D.O. can be kept in solution until it is consumed by the microbiota.

An exemplary design was prepared using the present disclosure for a large Midwestern city which routed the peak CSO flow through the oxygenator of the present disclosure. This design raised the D.O. in the CSO to 40 mg/L as it entered the storage basin. The raising of the D.O. forestalls $H_2S$ generation by providing sufficient D.O. to meet the microbial demand for over 2 days without the need for further oxygen supplementation.

If, for some reason, the D.O. becomes depleted from a CSO storage basin with conventional aeration systems, such as may occur by waiting too long to turn on the aeration system, $H_2S$ accumulates. The accumulated $H_2S$ is generally stripped from the water into the air by conventional aeration systems. However, with use of the system of the present disclosure, the negligible off-gas stripping potential reduces noxious gas stripping accordingly and eliminates the problem of oxygen transfer into septic wastewater.

As previously stated herein wastewater treatment lagoons commonly are utilized for treatment of industrial and intensive animal rearing wastewaters, but because these lagoons are commonly anaerobic and generate considerable $H_2S$, it is not unusual to require $1,000,000 to put a cover on such lagoons and treat the off-gas to mitigate odor generation. In contrast a properly designed oxygenation system according to the present disclosure can withdraw a sidestream of the supernatant overlying the anaerobic sludge deposits, add 50 to 100 mg/L of D.O., and return it to the supernatant without disturbing the sludge layer. Using such improved technology it is possible to maintain greater than 10 mg/L of D.O. in the entire supernatant layer, with minimal loss of oxygen to the atmosphere because the aeration rate of stagnant lagoon surfaces is relatively low. Such elevated D.O. concentrations can successfully prevent $H_2S$ formation in the supernatant and also effectively oxidize the low rates of $H_2S$ evolution from the sludge layer.

Traditionally, prior art aeration systems have been designed to satisfy aerated lagoon D.O. uptake rates of 20 to 80 mg/L-hr. The development of some of the more advanced aerobic treatment systems which use advanced cell immobilization techniques are capable of ten-fold increases in biomass concentrations. Only a properly designed oxygenation system, such as the system of the present disclosure, can meet the exceptionally high oxygen uptake rates of 300 to 500 mg/L-hr inherent in these advanced aerobic processes.

The exemplary systems of the present disclosure are very efficient as over 90% of oxygen gas is absorbed into the sewage stream and very high concentrations of dissolved oxygen are achieved in the sewage discharge. Other advantages of the present disclosure include: (a) minimization of the stripping of dissolved nitrogen from the sewage when using HPO; and (b) superoxygenation of a side stream initially rather than attempting to aerate the whole wastewater stream. Sometimes 50 to 100 mg/L supersaturation is required to accommodate high accumulative oxygen consumption. Highly superoxygenated side streams incorporated into the HPO treatment design of the present disclosure proportionately reduce the footprint of oxygen transfer systems as well as allow one time high D.O. additions allowing greater zones of influence in a gravity sewer. For satisfactory prevention of $H_2S$ only a few mg/L of D.O. in excess of the amount consumed in transit need be maintained. This is especially suited to odor/corrosion issues in gravity sewers, force main sewers, primary clarifiers, and combined sewage overflows. For instance, a gravity main superoxygenator can be pressurized to about 40 ft by a pump to superoxygenate the raw sewage to about 70 mg/L D.O. easily and effectively while still keeping the D.O. in solution.

Exemplary embodiments of the present disclosure are also operable to achieve four important characteristics for high oxic conditions in wastewater and storm water conveyance systems. These characteristics include: (a) at least 85% (for example, 90%) efficient oxygen absorption; (b) less than 400 kwhr/ton D.O. low unit energy consumption, and at least less than 1,000 kwhr of energy consumption per ton of D.O.; (c) at least 10 mg/L D.O. levels of superoxygenation (for example, 50 to 100 mg/L D.O. superoxygenation of the sidestream); and (d) effective retention of high D.O. concentrations in solution throughout treatment.

As set forth herein, the present disclosure has a myriad of applications in treatment of sewage. These include: (a) combating $H_2S$ formation in gravity sewers; (b) maintenance of aerobic conditions throughout the primary clarifier for odor control; (c) maintenance of aerobic conditions in combined sewer overflow (CSO) storage tunnels and basins; and (d) achieving D.O. uptake rates of greater than 300 mg/L-hr in advanced aerobic processes with mixed liquor suspended solids (MLVSS) concentrations exceeding 20,000 mg/L volatile suspended solids (VSS).

Figure 2:
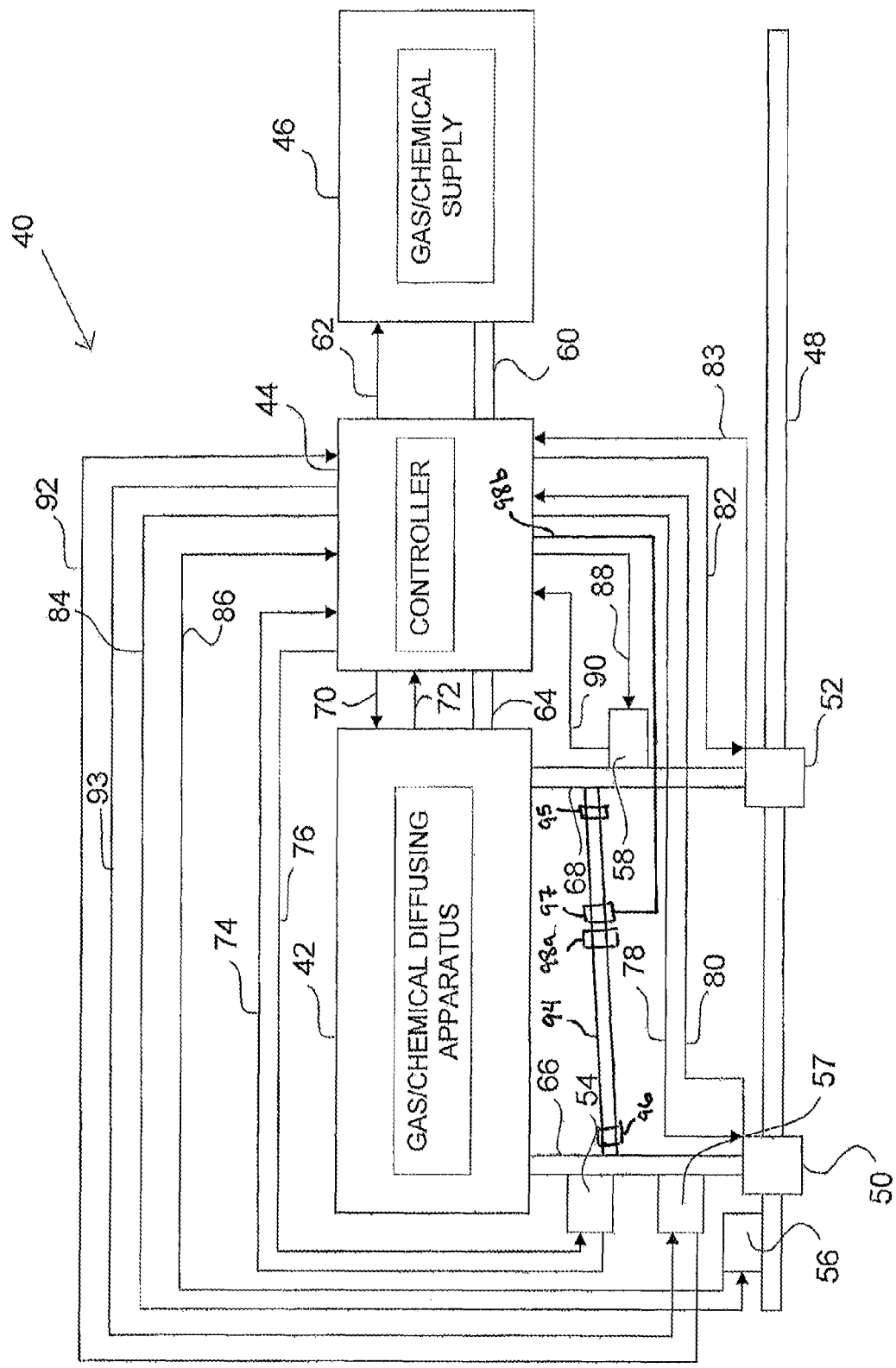
FIG. 2 shows a block diagram of at least one embodiment of the apparatus for gas/chemical control as applied to a force or gravity main, according to at least one embodiment of the present disclosure.

Referring now to FIG. 2, there is shown a block diagram of one embodiment of the apparatus for gas/chemical control according to the present disclosure as applied to a force or gravity main. System 40 of FIG. 2 comprises gas/chemical reactor 42, controller 44, gas/chemical supply 46, and fluid line 48. System 40 also comprises first valve 50, second valve 52, pump 54, first monitoring device 56, second monitoring device 57, and third monitoring device 58. Exemplary embodiments of system 10 of FIG. 1 may also be used in certain embodiments as exemplary embodiments of system 40.

First valve 50 is a variable position valve operable to divert some or all of the fluid (such as wastewater) in fluid line 48 into reactor 42. In the closed position of first valve 50, fluid flows in fluid line 48 without diversion into reactor 42, and in the completely open position of first valve 50, fluid is diverted into reactor 42 at a level that can be accommodated by fluid inlet 66. Because, in this embodiment, reactor 42 is positioned above fluid line 48, such diversion of fluid into reactor 42 also requires operation of pump 54 to move fluid from fluid line 48 into reactor 42. First valve 50 can be opened at various degrees between the closed position and the completely open position to control the amount of fluid diverted into reactor 42. Second valve 52 is a variable position valve operable to allow fluid flowing from reactor 42 into fluid line 48. In the closed position of second valve 52, fluid flows only within fluid line 48 and no fluid is allowed to enter fluid line 48 from reactor 42. In the completely open position of second valve 52, fluid is allowed to enter fluid line 48 from reactor 42 by the forces of gravity coupled with the operation of pump 54 which pulls fluid from fluid line 48 and pushes fluid through fluid inlet 66 into reactor 42 and into fluid outlet 68. Second valve 52 can be opened at various degrees between the open position and the completely closed position to control the amount of treated fluid from reactor 42 that enters fluid line 48. Such control of second valve 52 also results in control of the amount of time fluid remains in reactor 42, thereby effecting the amount of gas and/or chemical absorbed into the fluid in reactor 42.

Furthermore, an exemplary embodiment of the apparatus for gas/chemical control may also comprise an embodiment of a recirculation system, such as that described herein and depicted in FIGS. 1 and 2. Recirculation of fluid may be accomplished through closing second valve 52 and allowing fluid transit through recirculation channel 94, which connects fluid outlet 68 to fluid inlet 66. Control of the recirculation of fluid may be accomplished through a series of valves, and may be further powered by at least one pump. In an exemplary embodiment, fluid transit through recirculation channel 94 may be stopped by fourth valve 95 and optional fifth valve 96. Lastly, the flow of fluid through recirculation channel 94 may be increased through use of recirculation pump 97.

The application shown in FIG. 2 is that of a force or gravity main for sewage treatment. In an exemplary embodiment, the fluid flowing through fluid line 48 comprises sewage. When first valve 50 and second valve 52 are in their closed positions, no fluid is permitted to flow into reactor 42. Instead, all fluid flows through fluid line 48 so that the fluid contained in fluid line 48, the sewage in this example, is untreated. When first and second valves 50 and 52, respectively, are in their open positions and pump 54 is activated, some or all of the fluid in fluid line 48, the sewage in this example, is pulled into reactor 42 where the pulled fluid is treated and then allowed to reenter fluid line 48 at second valve 52.

Gas/chemical supply 46 contains the gas and/or chemical to be used to treat the fluid contained in fluid line 48. Reactor 42 dissolves, infuses, diffuses, or mixes such gas and/or chemical into the fluid by means well known in the art. In the example of application in force or gravity main, gas/chemical supply 46 contains oxygen and reactor 42 comprises a device capable of dissolving the oxygen into the sewage pulled into reactor 42. In one embodiment, reactor 42 comprises an oxygenator of the shape disclosed in U.S. Pat. No. 3,643,403 and comprises a flow chamber of uniformly increasing flow area in a downward direction, i.e., comprises a conical portion, such as conical portion 35 of FIG. 1 (see also FIG. 3B). Reactor 42 may or may not include a power operated impeller means as disclosed in U.S. Pat. No. 3,643,403.

Controller 44 comprises a means for monitoring and controlling various aspects of the fluid and the gas and/or chemical as is explained in greater detail herein. In this embodiment, controller 44 is in fluid connection with gas/chemical supply 46 and reactor 42, and is in electrical connection with gas/chemical supply 46, reactor 42, first valve 50, second valve 52, pump 54, first monitoring device 56, second monitoring device 57, and third monitoring device 58. Specifically, with regard to the fluid connections, controller 44 is in fluid connection with gas/chemical supply 46 via gas/chemical supply line 60. Controller 44 is in fluid connection with reactor 42 by gas/chemical inlet 64. Reactor 42 is in fluid connection with first valve 50 via fluid inlet 66 and is in fluid connection with second valve 52 via fluid outlet 68.

With regard to the electrical connections of controller 44 to other devices in system 40, controller 44 can control the flow of gas and/or chemical from gas/chemical supply 46 by electrical control over first electrical line 62. Controller 44 can control the flow of gas/chemical into reactor 42 and monitor certain parameters of reactor 42 over second and third electrical lines 70 and 72, respectively. Examples of parameters of reactor 42 that can be monitored by controller 44 include the temperature, pressure, and chemical composition of the contents held in reactor 42.

In an exemplary embodiment, controller 44 controls the operation of and collects information from pump 54 over fourth electrical line 74 and fifth electrical line 76, controls the operation of and collects information from first valve 50 over sixth electrical line 78 and seventh electrical line 80, controls the operation of and collects information from second valve 52 over eighth electrical line 82 and ninth electrical line 83, controls the operation of and collects information from first monitoring device 56 over tenth electrical line 84 and eleventh electrical line 86, controls the operation of and collection of information from second monitoring device 57 over seventeenth electrical line 92 and eighteenth electrical line 93, and controls the operation of and collection of information from third monitoring device over twelfth electrical line 88 and thirteenth electrical line 90. The types of information that controller can collect or monitor from pump 54, first valve 50, and second valve 52 depends upon the electronic capability of pump 54, first valve 50, and second valve 52, and may include current status, notice of failure, etc., as is well known in the art. In this embodiment, first monitoring device 56 measures data regarding the flow in fluid line 48 (also referred to for this embodiment as the force main flow), and second monitoring device 57 measures data regarding the flow of fluid in fluid inlet 66 (also referred to for this embodiment as the side stream flow). In this embodiment, third monitoring device 58 measures data about the temperature, pressure, and level of dissolved gas and/or chemical in fluid outlet 68. Further, system 40 may also comprise a recirculation monitoring device 98a operably connected to recirculation channel 94. Control of operation and collection of information from recirculation monitoring device 98a may be controlled by controller 44, which is electrically coupled to monitoring device 98a by recirculation electrical line 98b.

It will be appreciated that each of first, second, third, and recirculation monitoring devices 56, 57, 58, and 98b respectively, may be representative of more than one device. For example, third monitoring device 58 may be replaced with a pressure sensor, temperature sensor, and a meter capable of measuring the level of dissolved gas and/or chemical. It will be further appreciated that other monitoring devices may be made a part of system 40. Such additional monitoring devices may measure other operational parameters, including but not limited to the temperature and pressure within reactor 42, for example.

The use of two electrical lines for connection of controller 44 to various devices in system 40 is merely illustrative of a bidirectional electrical connection between controller 44 and the respective device. It will be appreciated by those of skill in the art that various types of electrical connections that comprise one or more electrical lines or even wireless connections may be used to achieve such bidirectional communication between controller 44 and the various devices. Such alternatives are contemplated to be within the scope of the present disclosure. It will also be appreciated by those of skill in that art that bidirectional electrical communication is not required with each device, but is beneficial to allow controller 44 to control the device and to collect data either measured by the device or indicative of the status of the device. For example, while it may only be necessary to control the operation of pump 54 with controller 44, it is advantageous for controller 44 to collect information about the status of pump 54 made available by the electronics of pump 54. As another example, while it may only be necessary to collect the data measured by first monitoring device 56, it is advantageous for controller 44 to be able to send a signal to first monitoring device 56 to activate first monitoring device 56 and to ensure that first monitoring device 56 is operating properly.

Figure 3A:
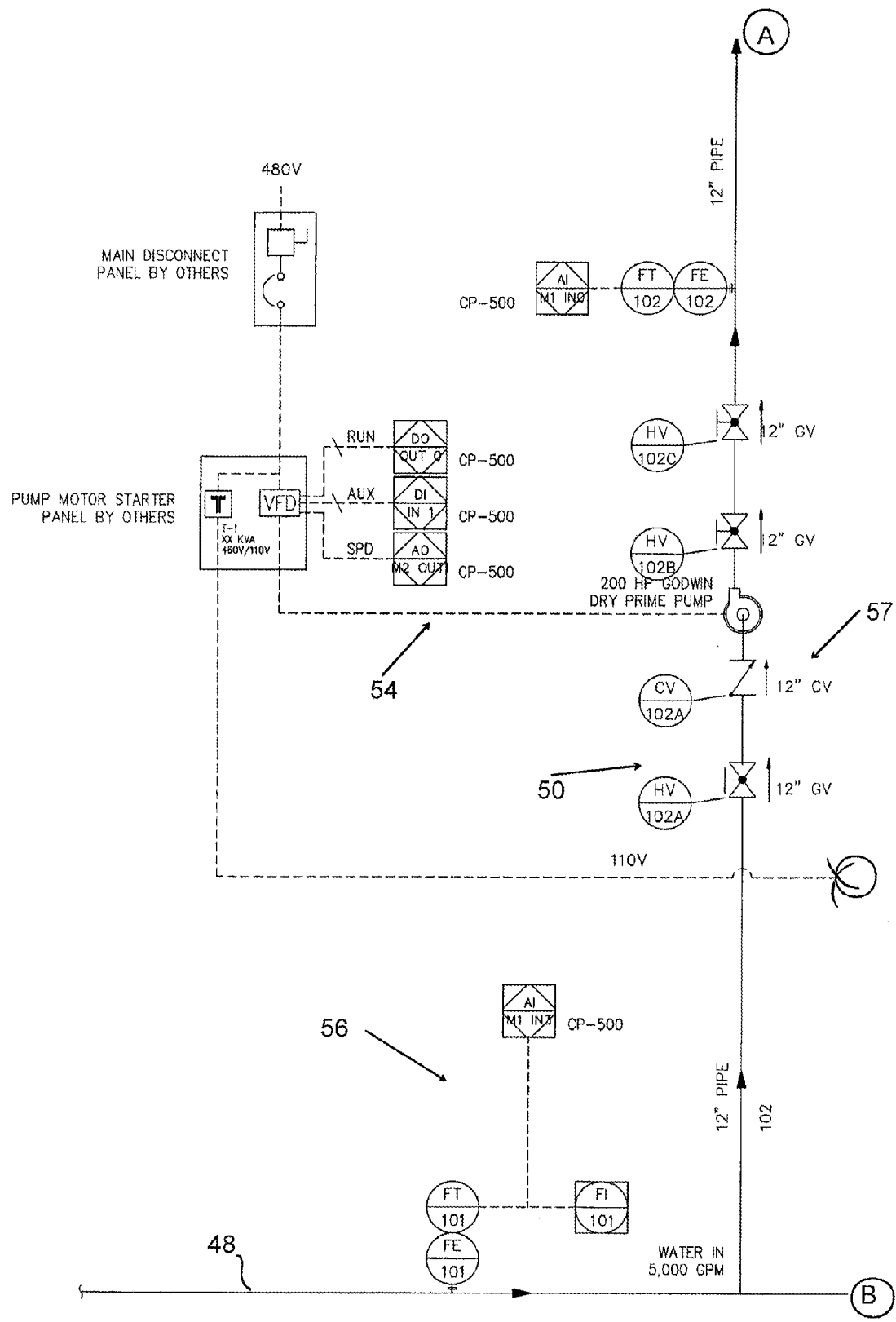
FIG. 3A, FIG. 3B, and FIG. 3C show schematic diagrams of the system of FIG. 2.
Figure 3B:
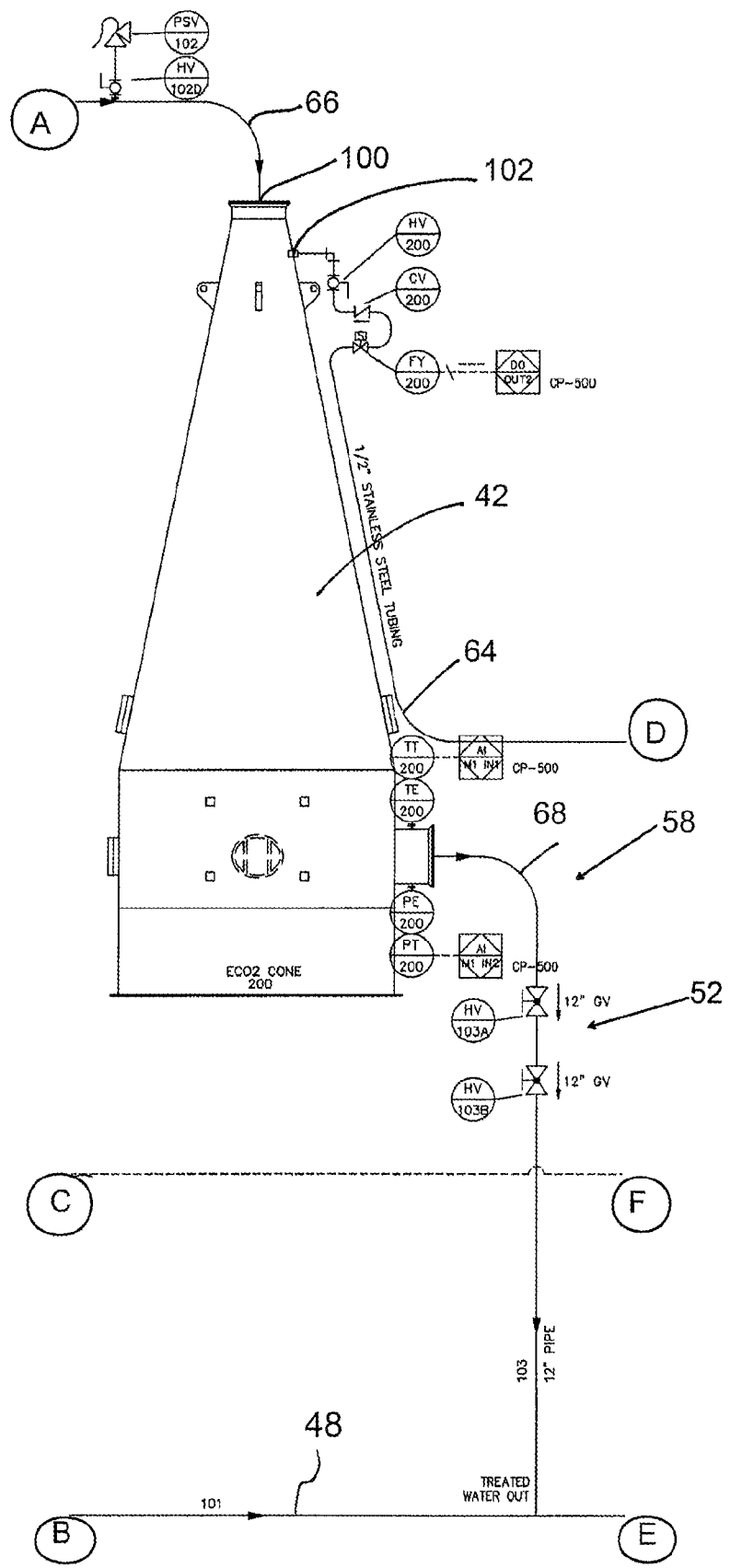
Figure 3C:
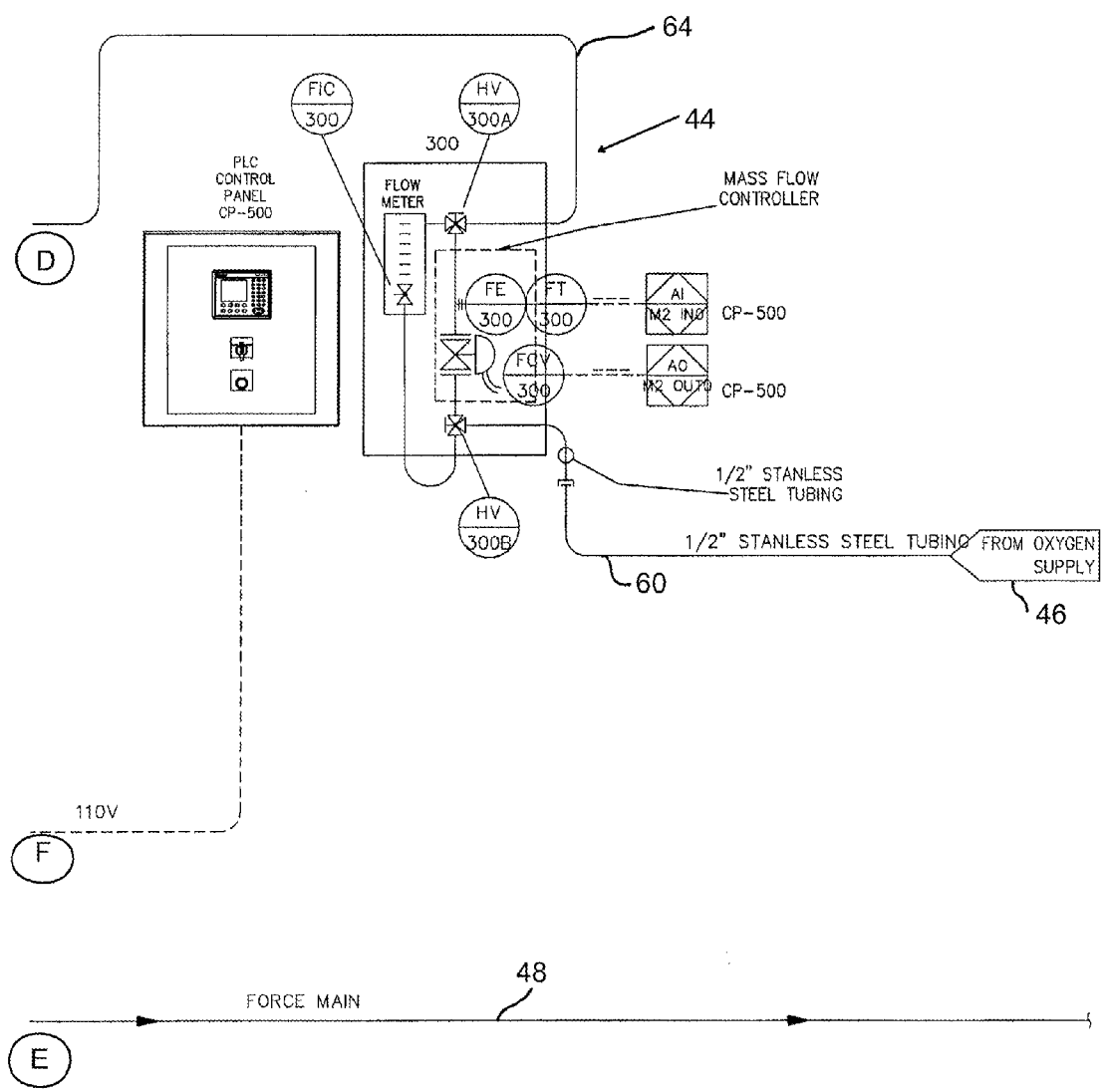
Figure 8:
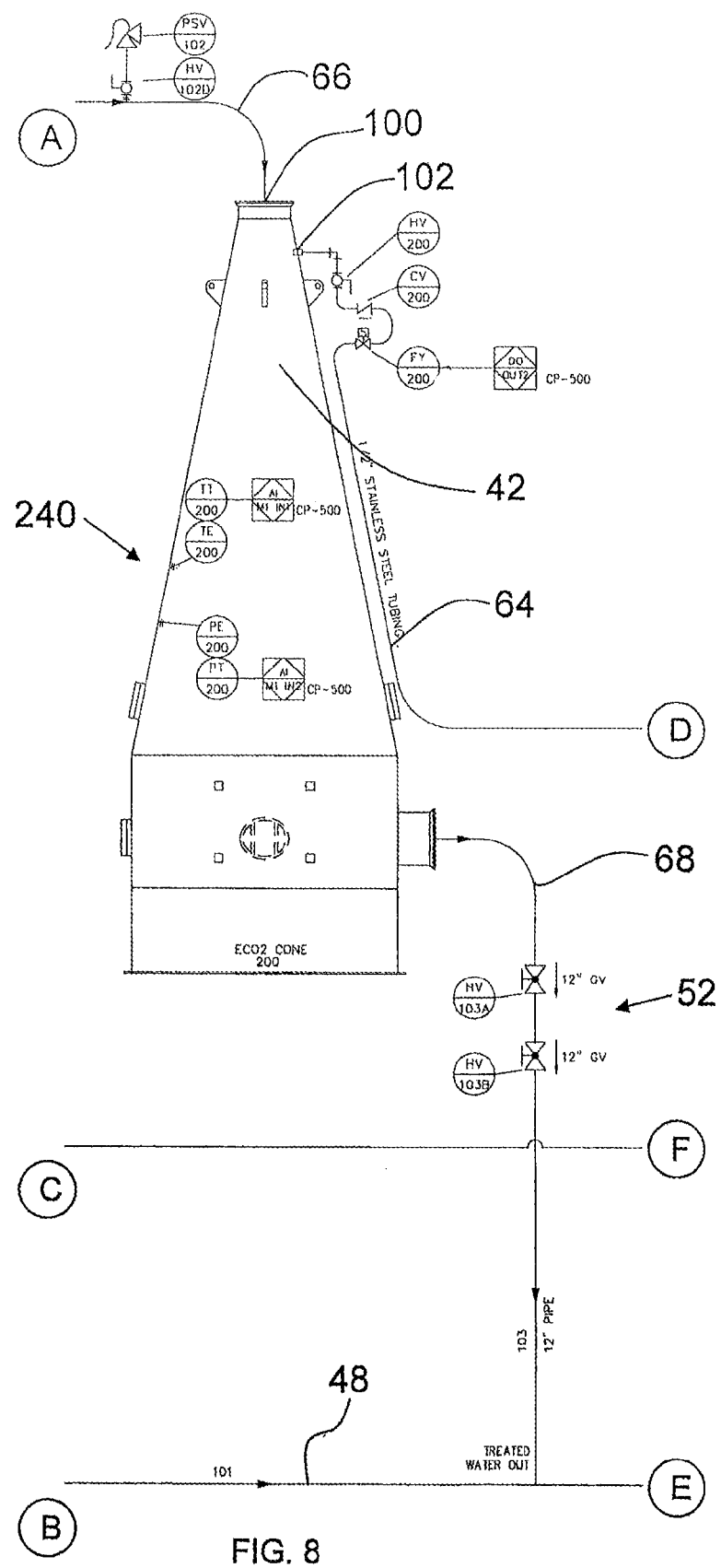
FIG. 8 shows a schematic diagram of the system of FIG. 2, according to at least one embodiment of the present disclosure.

FIG. 3A, FIG. 3B, FIG. 3C, and FIG. 8 show schematic diagrams of the system of FIG. 2. Specifically, FIG. 3A shows a schematic diagram of that portion of system 40 including fluid line 48, fluid inlet 66, first monitoring device 56, second monitoring device 57, and first valve 50. FIG. 3B shows a schematic diagram of that portion of system 40 including the continuation of fluid line 48, fluid inlet 66, fluid outlet 68, gas/chemical inlet 64, reactor 42, third monitoring device 58, and second valve 52. In this embodiment, reactor 42 further comprises fluid port 100 for receipt of fluid from fluid inlet 66 into diffusing device 42 and gas/chemical port 102 for receipt of gas/chemical from gas/chemical inlet 64 into reactor 42. FIG. 3C shows a schematic diagram of that portion of system 40 including fluid line 48, gas/chemical inlet 64, gas/chemical supply line 60, controller 44, and gas/chemical supply 46. FIG. 8 shows an alternate embodiment of that portion of system 40 wherein a third monitoring device 240 is positioned within the reactor 42. In this embodiment, the third monitoring device 240 is equivalent to the third monitoring device 58 of FIG. 3B. One embodiment of the electronics used to achieve the electrical communication of the devices shown in FIG. 2 and in FIGS. 3A, 3B, 3C, and FIG. 8 are shown in greater detail in association with FIG. 5A, FIG. 5B, FIG. 5C, and FIG. 5D hereof.

Figure 4:
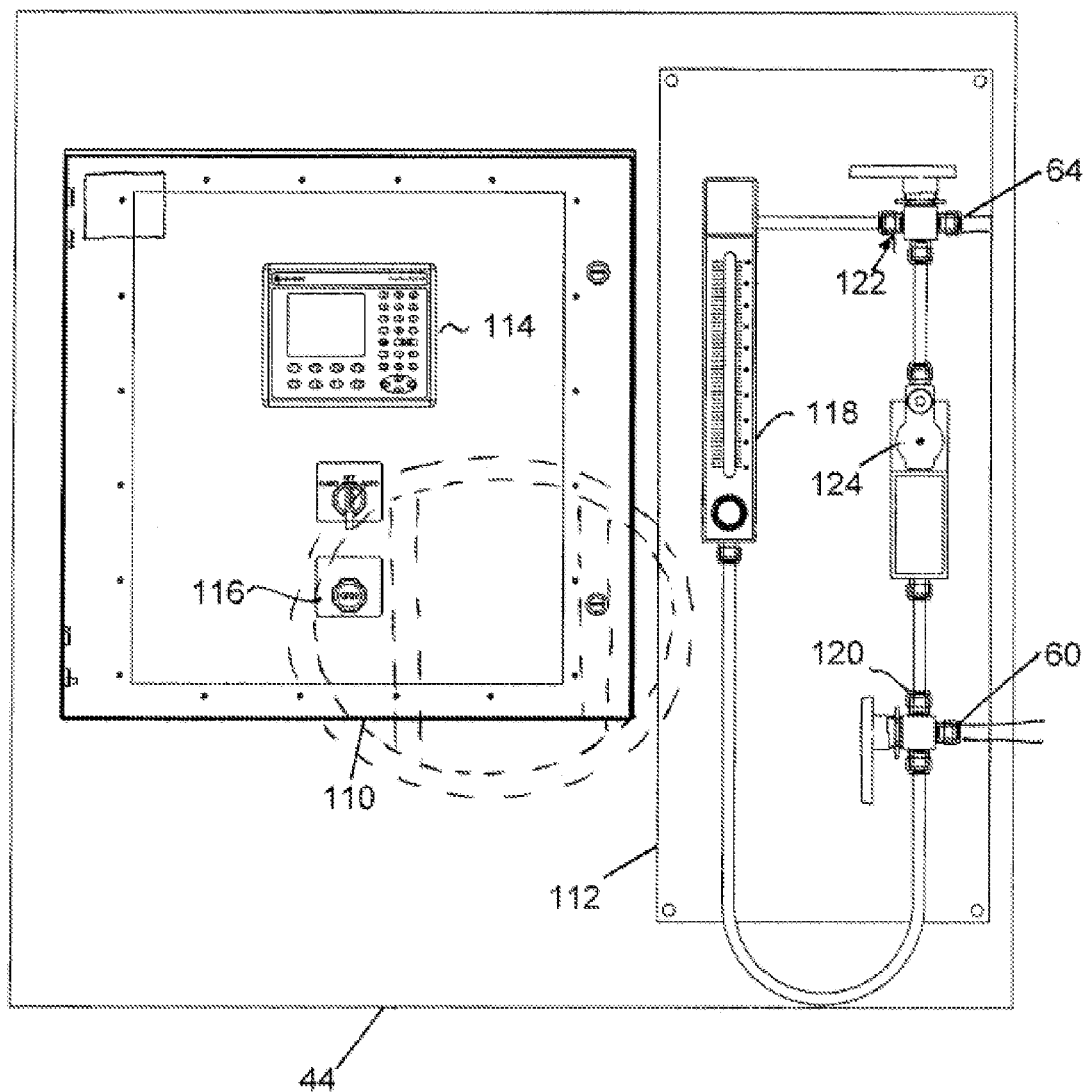
FIG. 4 shows a front view of the controller of the apparatus of FIG. 3A, FIG. 3B, FIG. 3C, and FIG. 8, according to at least one embodiment of the present disclosure.

Referring now to FIG. 4, there is shown a front view of one embodiment of the controller of the apparatus of FIG. 3A, FIG. 3B, FIG. 3C, and FIG. 8. In this embodiment, controller 44 comprises first panel 110 and second panel 112. First panel 110 comprises an input/output device 114 and an emergency stop 116. Input/output device 114 allows an operator to enter data and to see the data entered as well as information about the operation of system 40. In one embodiment, an operator may view all the data collected by controller 44. Emergency stop 116, when activated by an operator, stops the operation controller 44 and the various devices of system 40 to which controller 44 is connected. Second panel 112 comprises first controller valve 120 for receipt of the gas and/or chemical from gas/chemical supply line 60, second controller valve 122 to control flow of gas and/or chemical from controller 44 to gas/chemical line 64, and third controller valve 124 to automatically control the flow of the gas and/or chemical from gas/chemical supply 46 (see FIG. 2) through gas/chemical supply line 60 to reactor 42 (see FIG. 2) from gas/chemical line 64. Second panel 112 also includes manual gas and/or chemical adjustment device 118 to control the flow of gas and/or chemical from gas/chemical supply 46 to reactor 42 in the event that third controller valve 124, which serves as an automatic adjustment device, is not operating or is operating improperly. In this embodiment, each third controller valve 124 and manual adjustment device 118, and the combination of third controller valve 124 and manual adjustment device 118, serve as a flow meter for control of the flow of gas and/or chemical into reactor 42.

Figure 5A:
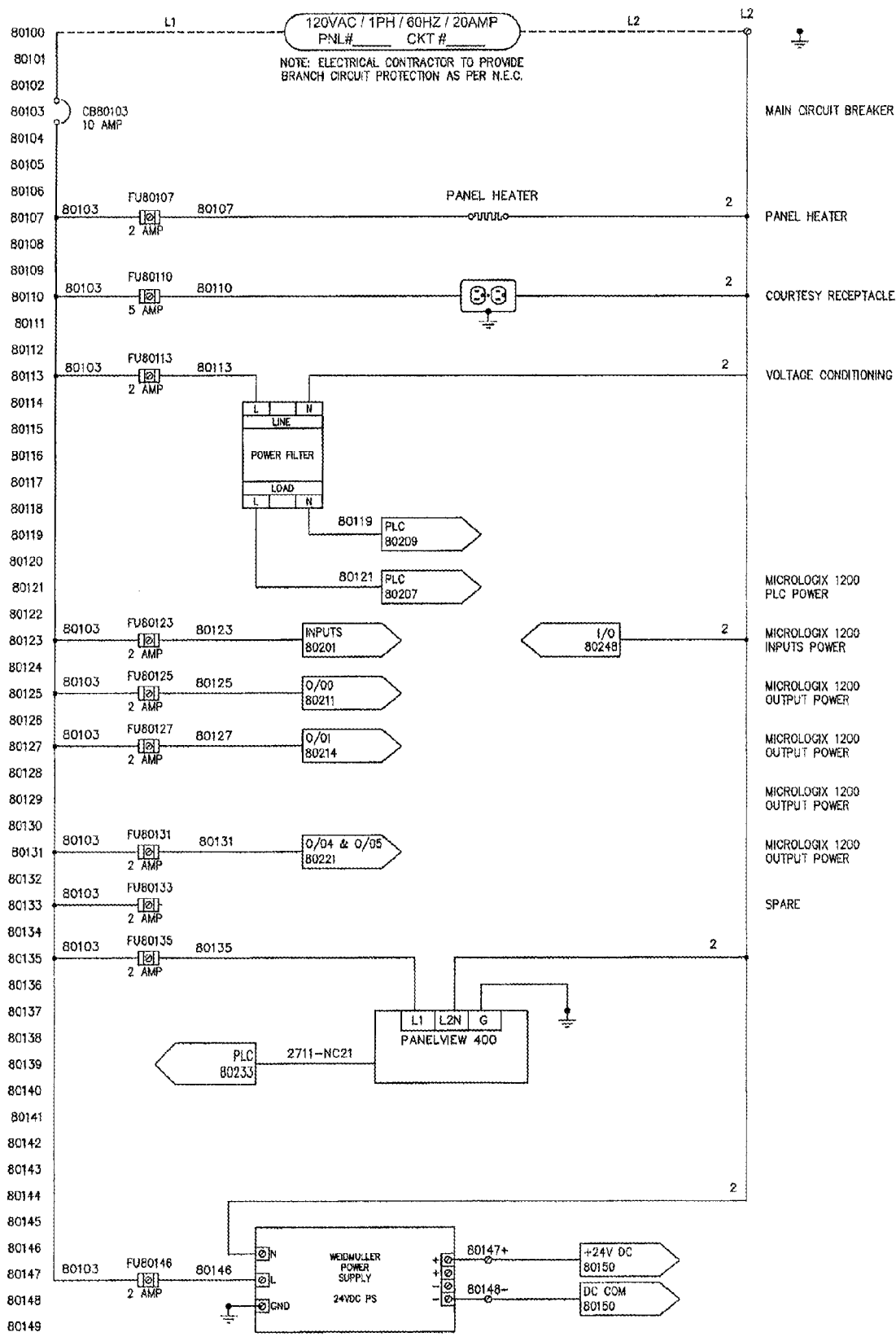
FIG. 5A, FIG. 5B, FIG. 5C, and FIG. 5D show digital schematics of the controller of FIG. 4, according to at least one embodiment of the present disclosure.
Figure 5B:
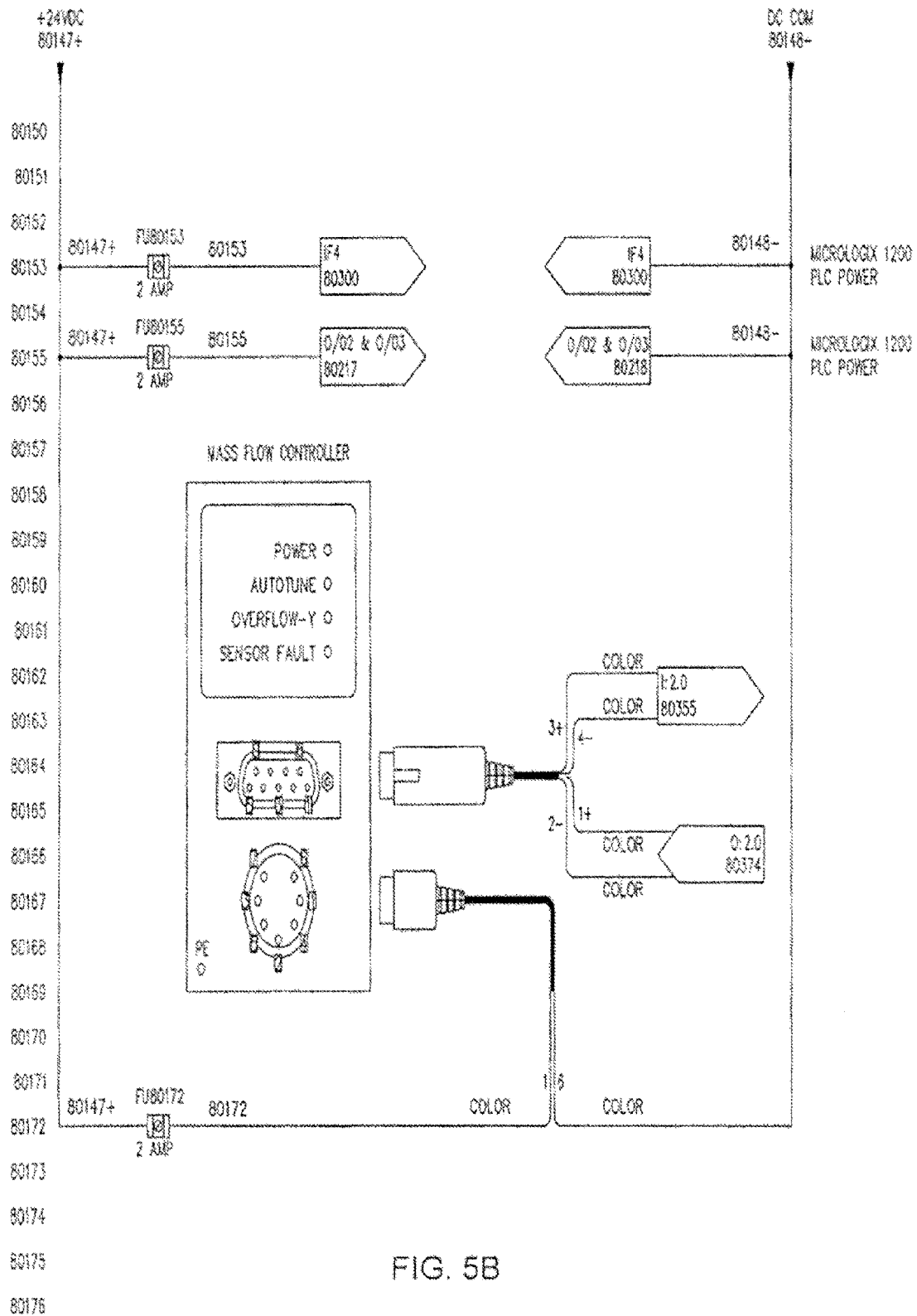
Figure 5C:
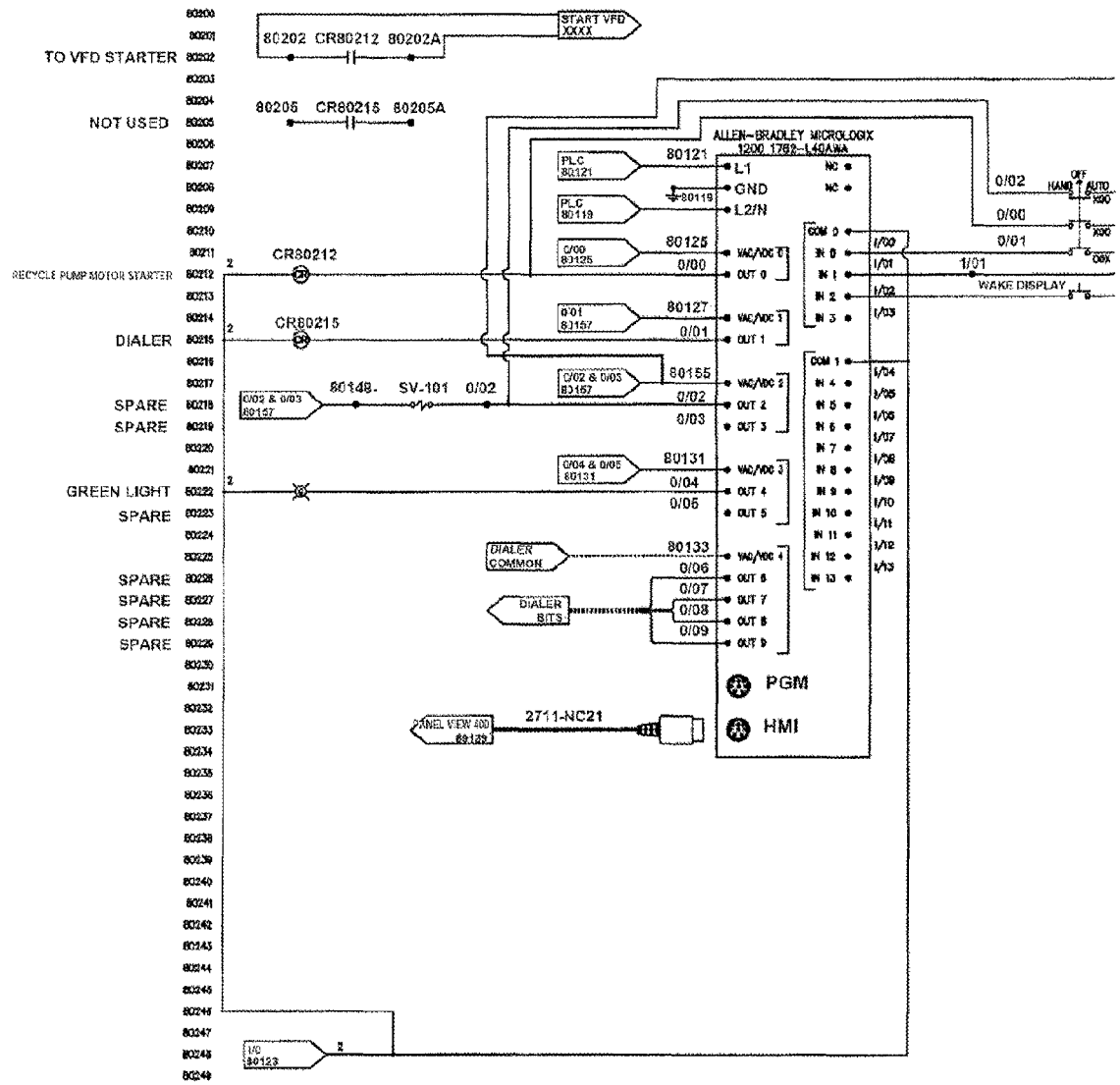
Figure 5D:
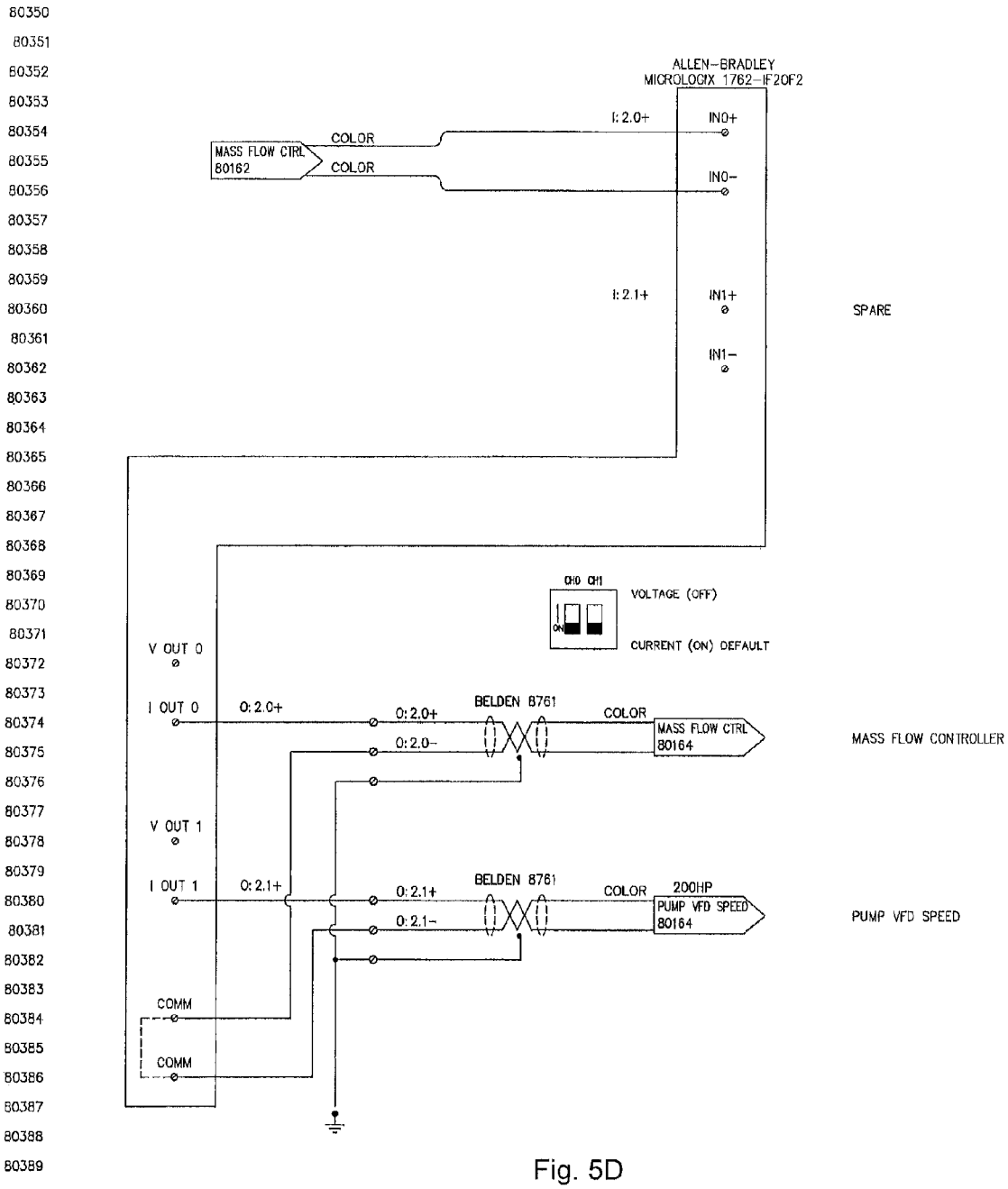

FIG. 5A, FIG. 5B, FIG. 5C, and FIG. 5D show digital schematics of the controller of the embodiment of FIG. 4. Collectively, FIG. 5A, FIG. 5B, FIG. 5C, and FIG. 5D show one embodiment of the electronics used for system 40. In this embodiment, the electronics of system 40 uses programmable logic controllers ("PLCs") for connection of controller 44 to various devices of system 40, for control of such devices, and for collection of information from such devices. In this embodiment, PLCs available from Allen-Bradley, namely, model numbers Micrologix 1200 1769-L40AWA (see FIG. 5C) and Micrologix 1762-IF20F2 (see FIG. 5D), are used for this purpose. The connections of the components of controller 44 and of devices external to the PLCs of controller 44 are illustrated in FIG. 5C and FIG. 5D. The mass flow controller portion of controller 44 is illustrated in FIG. 5B, and the power connections of the components of controller 44 are illustrated in FIG. 5A.

Figure 6:
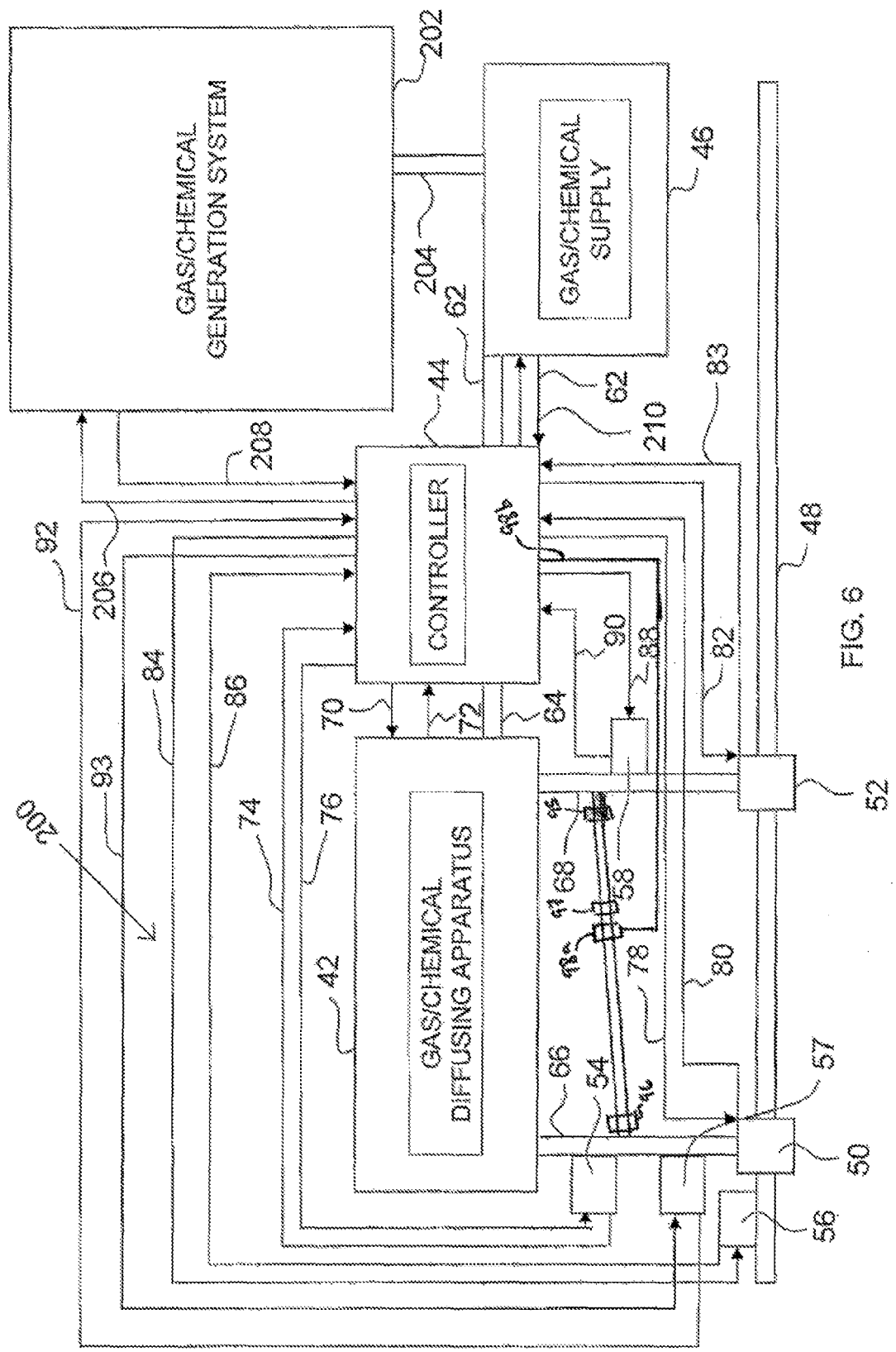
FIG. 6 shows a block diagram of a force or gravity main system having the apparatus for control of a gas and having a gas generation subsystem, according to at least one embodiment of the present disclosure.

Referring now to FIG. 6, there is shown a block diagram of another embodiment of a force or gravity main system according to the present disclosure having the apparatus for control of a gas and having a gas generation subsystem. System 200 differs from that of system 40 of FIG. 2 by the addition of gas/chemical generation system 202, generated gas/chemical line 204, fourteenth electrical line 206, fifteenth electrical line 208, and sixteenth electrical line 210. Gas/chemical generation system 202 is a system for generation of the gas and/or chemical to be used to treat the fluid. Such systems are well known in the art.

For example, for treatment of wastewater in the force gravity main application, the gas used to treat the wastewater is oxygen. In this embodiment, gas/chemical generation system 202 is used to generate oxygen. An example of an oxygen generation system includes the mid-size generators made by Oxygen Generating Systems International of North Tonawanda, N.Y. The oxygen generation systems of Oxygen Generating Systems International usually comprise an air compressor, air dryer, air receiver tank, and oxygen generator. The air compressor compresses air and includes particulate and coalescing filters. The compressed and filter air flows from the air compressor the air dryer where the air is dried. The dried air is then sent to an air receiver tank. The filtered, dried air from the air receiving tank is then fed into a generator where substantially pure oxygen is generated from the air. The substantially pure oxygen can then be fed into a supply tank, such as gas/chemical supply 46 show in FIG. 6.

Returning now to FIG. 6, gas/chemical generation system 202 is in fluid connection with gas/chemical supply 46 via generated gas/chemical line 204. In this embodiment, gas/chemical generation system 202 is electrically connected via fourteenth and fifteenth electrical lines 206 and 208 to permit controller 44 to control, monitor, and collect information from gas/chemical generation system. In this embodiment, another electrical line, namely, sixteenth electrical line 210, is added between gas/chemical supply 46 and controller 44 to permit for monitoring and collection of information from gas/chemical supply 46. In this manner, system 200 is a closed loop system—having all operable devices connected to controller 44.

As was discussed above in association with FIG. 2, the use of two lines between devices in FIG. 6 is illustrative of bidirectional communication between the device and controller 44. It will be appreciated that it may be desirable in FIG. 2 to include bidirectional communication between controller 44 and gas/chemical supply 46, and such is contemplated to be within the scope of the disclosure.

Figure 7:
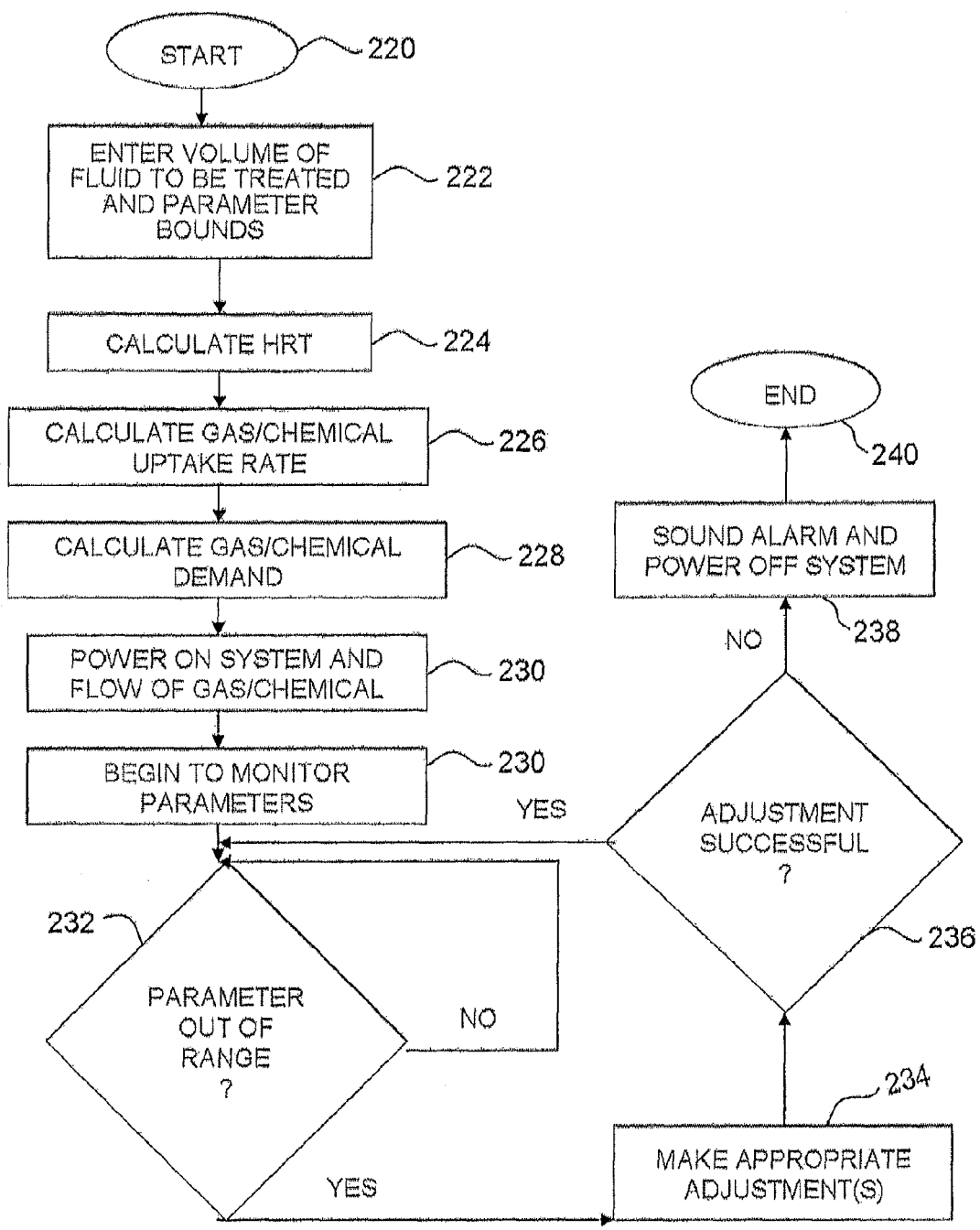
FIG. 7 shows a flowchart of the method of control of a gas or chemical for treatment of a fluid, according to at least one embodiment of the present disclosure.

Turning now to the operation of system 40 of FIG. 2, FIG. 7 shows a flowchart of one embodiment of the method of control of a gas or chemical for treatment of a fluid according to the present disclosure. The operation of system 40 begins at step 220. Steps 222, 224, 226, and 228 are initialization steps that occur prior to powering on of system 40 in step 230. At step 222, the volume of fluid to be treated (the flow of fluid through fluid line 48 that is to be treated) is entered into controller 44 as are the bounds for various parameters to be monitored by controller 44. Entry of such data may occur manually at input/output device 114 (see FIG. 4) and/or be programmed into controller 44. In one embodiment wherein system 40 is used in a force or gravity main for treatment of wastewater, such parameters and their bounds are:

| Parameter | Lower Bounds (About) | Upper Bounds (About) |
| --- | --- | --- |
| Temperature of contents of reactor 42 as measured by a temperature sensor included in reactor 42 or at third monitoring device 58 | 0° C. | 100° C. |
| Pressure of contents of reactor 42 as measured by a pressure sensor included in reactor 42 or at third monitoring device 58 | 0 psi | 300 psi |
| Side stream flow at second monitoring device 57 | 0 gpm | 10,000 gpm |
| Flow from gas/chemical supply line 60 as measured by flow meter (118 and/or 124) | 0 scfm | 1000 scfm |
| Flow from gas/chemical inlet 64 as measured by a sensor placed along gas/chemical inlet 64 | 0 scfm | 1000 scfm |
| Level of dissolved gas/chemical (in this embodiment, dissolved oxygen) from third monitoring device 58 | 0 mg/L | 300 ml/L |
| Gas/chemical absorption efficiency (percent of gas/chemical metered into reactor 42 that is actually dissolved, and is calculated by dividing the level of dissolved gas/chemical by the flow rate at gas/chemical inlet 64) | 0% | 99% |
| Force main flow measured by first monitoring device 56 | 0 gpm | 50,000 gpm |

At step 224, the hydraulic retention time ("HRT") of the fluid in reactor 42 is calculated. HRT is calculated by dividing the volume entered in step 222 by the fluid flow rate through line 48.

The gas/chemical uptake rate is determined at step 226 based on the temperature of the fluid in reactor 42 or as measured by third monitoring device 58 (as such information is collected by controller 44). In one embodiment of the example of use in a force or gravity main for wastewater treatment, if the temperature of the fluid measured in reactor 42 (or as measured by third monitoring device 58) is from about 0° C. to about 15° C., then the oxygen uptake rate is set at about 5 mg/L/hr; if the measured temperature is from above about 15° C. to about 34° C., then the oxygen uptake rate is set at about 10 mg/L/hr; and if the measured temperature is greater than from about 34° C., then the oxygen uptake rate is set at about 15 mg/L/hr. Such rates are generally based on prior measurements or experience, or on desired levels, and may be determined based on a table or, for greater precision, in accordance with an appropriate equation.

At step 228, the gas/chemical demand is calculated. The gas/chemical demand is calculated by multiplying the HRT by the gas/chemical uptake rate. At step 230, controller 44 activates various devices to which it is electrically connected. In one embodiment, controller 44: (a) places first valve 50 in its second position, places second valve 52 is its second position, and activates pump 54 to allow fluid to flow from fluid line 48 through fluid port 100 into reactor 42; (b) activates gas/chemical supply 46, sets flow meter 118 and/or 124 to the calculated gas/chemical demand, and opens first controller valve 120 and second controller valve 122 to permit the gas and/or chemical from gas/chemical supply 46 to flow through gas/chemical supply line 60 into gas/chemical inlet 64 and through gas/chemical port 102 into reactor 42; and (c) activates first, second, and third monitoring devices 56, 57, and 58, respectively, to enable controller 42 to collect data from first, second, and third monitoring devices 56, 57, and 58, respectively. At the conclusion of step 230, system 40 is operational to treat the fluid with the gas and/or chemical in reactor 42.

At step 230, controller 42 begins to monitor various parameters to ensure proper and safe operation of system 40. At step 232, each of the parameters is compared to the upper and lower bounds established for that parameter. Ideally, such comparison should be simultaneous, and or near simultaneous, so that not significant time elapses in making all the comparison necessary.

If it is determined at step 232 that all of the parameters are within the specified range for that parameter, controller 44 returns to step 232. If, on the other hand, one or more of the parameters is out of its specified range, the controller proceeds to make appropriate system adjustments in step 234. Specific adjustments for various parameters are discussed later herein. At step 236, controller 44 looks at appropriate data to ascertain whether the adjustment(s) made were successful, i.e., to determine if all parameters are within the specified range for that parameter. If all parameters are in the specified ranges, controller 44 returns to step 232. If, on the other hand, all parameters are not within the specified ranges, controller 44 proceeds to step 238. At step 238, controller 44 issues an alarm and powers off the system. The issuance of the alarm by controller 44 may comprise a visual and/or an audio alarm, a computer message, or any other alarming device well known in the art. The process of powering off system 40 in step 238 includes: (a) turning off pump 54 and placing first and second valves 50 and 52, respectively, in their closed positions to prohibit the flow of fluid from fluid line 48 into reactor 42; (b) closing first controller valve 120 and second controller valve 122 and deactivating gas/chemical supply 46 to prohibit the gas and/or chemical from gas/chemical supply 46 from flowing into reactor 42; and (c) optionally, deactivating first, second, and third monitoring devices 56, 57, and 58, respectively. At step 240, the monitoring of system 40 is illustrated to end.

With respect to steps 232, 234, 236, 238, and 240, immediately following are some examples of the handling of parameters monitored by controller 44. Pump 54 is monitored by controller 44 to ensure operation in accordance with design operating conditions. Specifically, the side stream flow at pump 54 is monitored by second monitoring device 57, and if it is determined at step 232 that the measured side stream flow exceed the specified bounds therefor, controller 44 adjusts pump 54 at step 234 to try to bring the side stream flow within specified tolerances. Should the flow rate in fluid line 48 also be below tolerances, controller may activate the recirculation of the outflow back into the reactor 42, as described herein, to maintain an acceptable volume of fluid within the reactor 42. If it is determined at step 236 that the side stream flow, or any other parameter, is out of tolerances, then controller 44 proceeds to step 238 to issue an alarm and power down system 40.

The flow of gas and/or chemical through controller 44 is measured to ensure performance in accordance with predetermined design operating conditions. Specifically, at step 232, the flow rate at gas/chemical supply line 60 and/or at gas/chemical inlet 64 is compared by controller 44 to the specified range(s) therefor. If it is determined at step 232 that the flow exceeds the specified range, at step 234, controller 44 adjusts flow meter 118 and/or 124 to attempt to bring the flow of gas and/or chemical within the specified range. If it is determined at step 236 that the flow of gas and/or chemical is still outside tolerances, or if any other parameter is outside of that parameter's tolerances, then, at step 238, controller 44 proceeds to issue an alarm and power down system 40.

The level of dissolved gas and/or chemical is monitored to ensure operating performance in accordance with predetermined design operating conditions. The level of dissolved gas and/or chemical is measured at third monitoring device 58. If at step 232, it is determined that the measured level of dissolved gas and/or chemical exceeds the specified tolerances, then controller 44 at step 234 adjusts flow meter 118 and/or 124, and/or adjusts first valve 50 and/or second valve 52 (to adjust the amount of time fluid is retained in reactor 42) to try to bring the level of dissolved gas and/or chemical into specified tolerances. If it is determined at step 239 that the level of gas and/or chemical is still outside tolerances, or if any other parameter is outside of that parameter's specified range, then controller 44, at step 238, proceeds to issue and alarm and power down system 40.

With regard to the measurement of dissolved gas and/or chemical, it will be appreciated that the measurement and adjustments made in response to the measurement provides a dynamic feedback parameter for control of the gas and/or chemical injection into reactor 42, without regard to whether the level of dissolved gas and/or chemical exceeds the specified tolerances. For example, it is generally desired to maintain a preferred level of dissolved gas and/or chemical in reactor 42, and controller 44 can be used to increase or decrease the rate of injection of gas and/or chemical into reactor 42 to maintain such a desired level.

The gas/chemical dissolution rate is the amount of gas and/or chemical dissolved by reactor 42. The gas/chemical dissolution rate is calculated and monitored by controller 44 to ensure operating performance in accordance with predetermined design operating conditions. The calculation of the gas/chemical dissolution rate is made using standard gas transfer equations, and involves the multiplication of the measured dissolved gas/chemical value, gas transfer coefficient, and side stream flow rate to show the amount of gas and/or chemical dissolved in a specified time period. If the gas/chemical dissolution rate is determined in step 232 to be out of the specified tolerances, controller 44 may, in step 234, adjust the feedrate of the gas and/or chemical with flow meter 118 and/or 124, and/or adjust first valve 50 and/or second valve 52 (to control the retention time in reactor 42) to resolve the issue. If it is determined at step 236 that the gas/chemical dissolution rate is still out of tolerances, or any other parameter is out of its specified tolerances, controller 44 proceeds to step 238 to issue and alarm and to power off system 40.

The gas/chemical absorption efficiency is the percent of gas and/or chemical metered into reactor 40 that is dissolved into the fluid in reactor 42, and therefore is measured by examining the level of diffused gas/chemical in reactor and measuring the gas and/or chemical flow rate at flow meter 118 and/or 124. In the event it is determined at step 232 that the absorption efficient is out of specified tolerances, controller 44, at step 234 adjusts the feedrate of the gas and/or chemical with flow meter 118 and/or 124. If it determined at step 236 that the absorption efficiency is still out of tolerances, or any other parameter is out of its specified tolerances, controller 44 proceeds to step 238 to issue an alarm and power down system 40.

Pressure and temperature within reactor 42 or as measured by third monitoring device 58 are monitored to ensure operating performance in accordance with predetermined design operating conditions. If it is determined by controller 44 at step 232 that either pressure or temperature are out of the desired respective tolerances, controller 44, at step 234, adjusts the pressure in reactor 42 by adjusting first valve 50 and/or second valve 52. If controller 44 determines at step 236 that pressure or temperature, or any other parameter, is outside of the respective tolerances, then controller 44 proceeds to step 238 to issue and alarm and to power down system 40.

The measurement of side stream flow by second monitoring device 57 is also desired for reasons other than maintaining the appropriate introduction of gas and/or chemical into reactor 42. If controller 44 determines that there is no or substantially no flow in the side stream by measurement with second monitoring device 57, controller 44 may proceed to power down system 40 or to restrict the introduction of gas and/or chemical into system 40 to avoid the accumulation of gas and/or chemical either in reactor 42 or into fluid line 48 where the gas and/or chemical could pose a safety hazard. In the embodiment of system 40 applied in a force or gravity main, such low side stream condition could also be accommodated by recycling the reactor 42 effluent back into the influent by leaving first valve 50 is its second position, and placing second valve 52 in a closed position. In addition to these steps, recycling may be aided as well through opening of fourth valve 94 (and if needed fifth valve 95), and activation of recirculation pump 97 to allow fluid from the oxygenator to be recycled back into system 40.

With regard to the operation of system 200 of FIG. 6, the same process may be used as is used in connection with system 40 of FIG. 2. In addition, controller 44 may control the generation of gas and/or chemical by gas/chemical generation system 202, and to ensure that enough gas and/or chemical is present in gas/chemical supply 46.

While the example discussed above in association with FIG. 2, FIG. 3A, FIG. 3B, FIG. 3C, FIG. 4, FIG. 5A, FIG. 5B, FIG. 5C, FIG. 5D, FIG. 6, and FIG. 7 is a force or gravity main water treatment application, it will be appreciated by those of skill in the art that other applications for the dissolution of a gas and/or chemical into a fluid for treatment of the fluid are contemplated to be within the scope of the disclosure. For example, the apparatus and method of the present disclosure may be used in systems to control hydrogen gas for saturating unsaturated fats and oils, for hydrogenation of coal conversion products, for the introduction of ozone for water treatment, for introduction of methane gas for methanotrophic bacteria bioremediating trichloroethylene contamination in ground water, for stripping dissolved nitrogen from water used in aquaculture by injecting oxygen gas, for treating water or wastewater with the oxygen contained in air, and for treating wastewater with oxygen together with a chemical such as chlorine, peroxide, or nitrate.

It will also be appreciated that the prior art systems for the dissolution of a gas and/or chemical into a fluid for treatment of the fluid do not completely dissolve, mix, diffuse, or infuse the gas and/or chemical before it is discharged into the fluid line or receiving tank. Embodiments of the present disclosure act to completely dissolves, mixes, diffuses, or infuses the gas and/or chemical prior to discharge, and provides control over the level of gas and/or chemical dissolved, mixed, diffused, or infused. In addition, the present disclosure incorporates dynamic feedback control for control of gas and/or chemical injection to match the demand for the gas and/or chemical into the system for the desired results.

Further, because controller 44 is in communication with various devices for the collection of data from such devices and for the control of such devices, controller 44 may retain in data storage media the data collected, data representative of status of the devices as controlled by controller 44 (open, closed, etc.), the parametric data, the established tolerances for the parameters, and/or the calculated data. The retention of such data is beneficial for several reasons. Examination of the data by means well known in the art may be informative as to conditions occurring prior to powering down of the system, to improve upon the set-up of the system, and/or to learn about the operation of the system. Such learning may result in changes in tolerances, for example.

It will be further appreciated that the system and method of the present disclosure accommodate changes in demand for the supply of the gas and/or chemical to the reactor as the system's operating parameters change. The ability to accommodate such changes assists to ensure that the system is operating optimally under the changing circumstances. In application for wastewater treatment, the system assists to avoid the odor and corrosion caused by insufficient levels of dissolved oxygen, and for aeration of water systems, the system assists in avoidance of the aquatic life disruption.

It will be yet further appreciated that the system of the present disclosure is comprised of commercially available and reasonably priced components, so as to result in a system that is reasonable in capital costs and in the costs associated with maintenance and repair. For example, controller 44 as illustrated herein is comprised of PLCs, an operator interface terminal, and alarm notification instrumentation available from more than one manufacturing source. Generally, controller 44 comprises at least one processor, such as the PLCs, microprocessor(s), or other combinations of hardware and/or software well known in the art. Controller 44 may also comprise data storage media (memory, RAM, hard disk, memory stick, or other devices well known in the art) for the storage of the entered volume, the parameters, and the tolerances for the parameters, and for retention of the operational data collected during operation of the system according to the present disclosure.

It will still further appreciated that, while various specific electronics are illustrated in FIG. 3A, FIG. 3B, FIG. 3C, FIG. 4, FIG. 5A, FIG. 5B, FIG. 5C, and FIG. 5D, various alternatives to such electronics that are well known in the art are contemplated to be within the scope of the disclosure. For example, in lieu of or in concert with the use of PLCs, various combinations of hardware and/or software may serve the same function as set forth herein.

It will be yet further appreciated that the addition of a gas/chemical generation system, such as is illustrated in association with FIG. 6, results in a self-contained system requiring only that the initial material be made available to the generation system and that power be provided to the system. In the case of oxygen generation, no initial material is required to be provided as oxygen is generated from air. Thus, regardless of the gas and/or chemical to be introduced, the addition of the generation system reduces the costs associated with operation and limits the number of personnel required for operation of the system.

It will also be appreciated that it is possible to eliminate the requirement of the gas/chemical supply in the system of the present disclosure. Such elimination is conceivable if a readily available supply of the gas and/or chemical used to treat the fluid is available without storage. For example, when the system includes the generation system, if the generation system is able to produce the gas and/or chemical at rates equal to or greater than the demand for operation of the system, the gas/chemical supply would not be needed in such a system.

It will be further appreciated that variations may be made to the process of adjustments made for a parameter that is out of the specified tolerances and be within the scope of the disclosure. The examples given herein are based on a single measurement of parameters made after the adjustment has been made. This is a very tight system—one that can quickly result in the system being powered down. One may lengthen the time period the controller uses between the subsequent measurements to be more forgiving. Alternatively, a series of measurements may be made before the system is powered down. By making a series of measurements, the controller can ascertain whether the adjustment(s) made are in the process of resolving the out-of-bounds parameter, and, if such progress is determined to be in process, the controller may continue to make additional adjustment(s) or wait a longer period of time to see if the system and all parameters returns to a desired and/or safe operation. Various of these techniques, as well as others well known in the art, may be used for all parameters or for different parameters. For example, if pressure in the reactor exceeds a safe threshold, the system can be immediately powered down, but if other less critical parameters, such as a level of dissolved gas and/or chemical is slightly below the lower threshold, the controller could be "more patient" and allow for either a greater amount of time and/or make several measurements before determining it is necessary to power down the system.

As used in the claims, the term "treatment additive" refers to the gas and/or chemical to be added to the fluid. A treatment additive comprises at least one of a gas or chemical, and may comprise a combination of a gas and a chemical, a gas introduced to the reactor at one port and a chemical introduced to the reactor at another port, or any number of gases and/or chemicals introduced together and/or separately to the reactor. By use of this term, measurement related to the treatment additive may comprise separate measurements of each gas and/or chemical, and/or measurements of the combination of all gases and chemicals introduced into the reactor.

While various embodiments of systems for the treatment of fluid, and methods of use thereof, have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the spirit and scope of the present disclosure.

Figure 9:
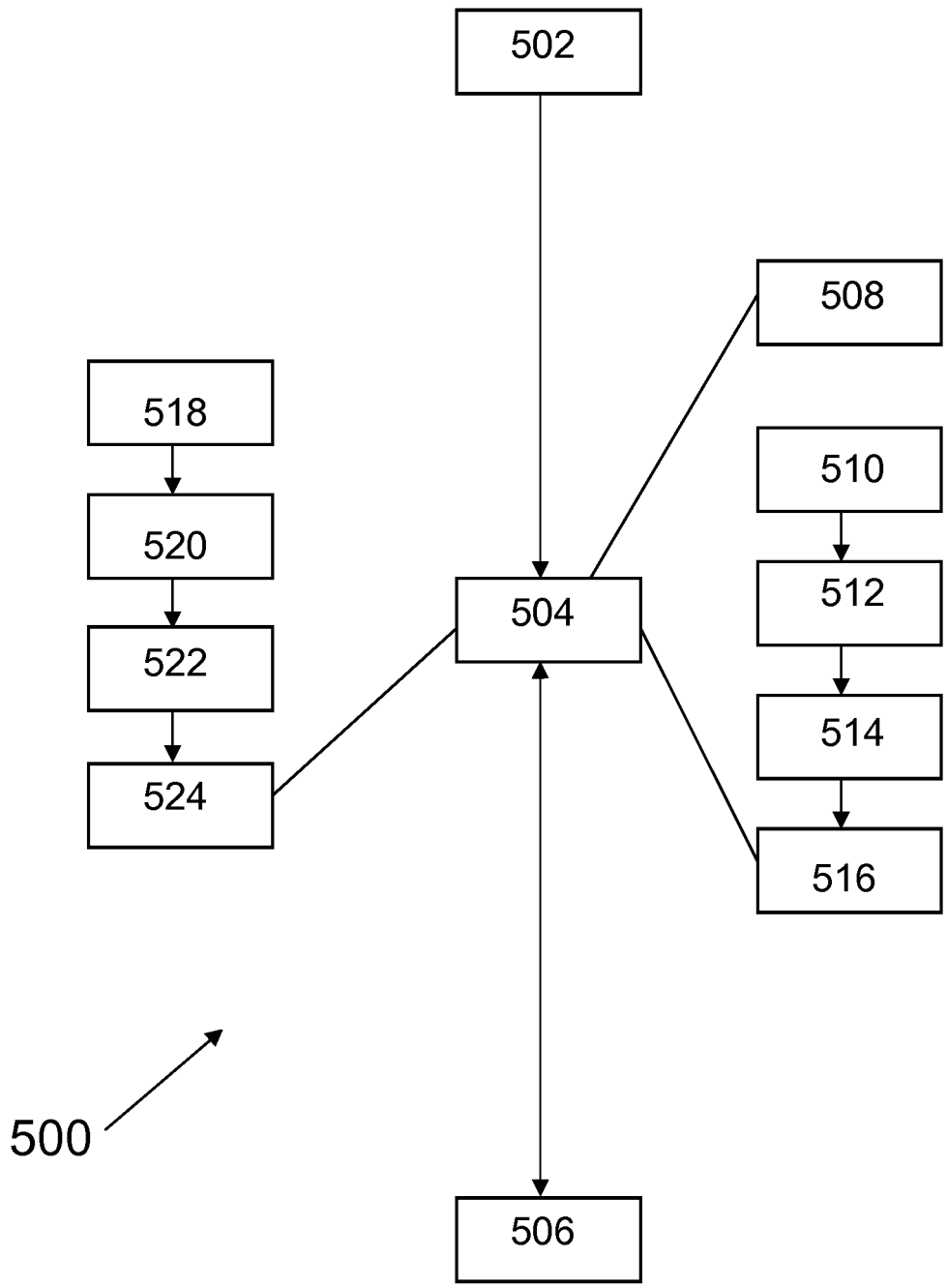
FIG. 9 shows a flowchart of the method of control of a gas or chemical for treatment of a fluid, according to at least one embodiment of the present disclosure.

Turning to FIG. 9, a flowchart depicting the steps of at least one embodiment of a method for treating wastewater of the present disclosure is shown. Exemplary method 500 for treating wastewater comprises the steps of providing an exemplary embodiment of a system (such as system 10 or 40) of the present disclosure (an exemplary providing step 502), introducing wastewater into the system through the wastewater inlet and oxygen into the system from the oxygen source (an exemplary introducing step 504), and recirculating oxygenated wastewater from the wastewater outlet to the wastewater inlet through the recirculation mechanism (an exemplary recirculating step 506).

In at least one embodiment of a method for treating wastewater of the present disclosure, the method further comprises the steps of adjusting, under the control of the controller, the amount of oxygen introduced into the oxygenator in response to the amount of oxygen measured as present in the oxygenated wastewater (an exemplary adjusting step 508), wherein the controller is operably connected to the oxygen source, the wastewater outlet, and the oxygenator. Optionally, the recirculation mechanism may further comprise one or more of (1) at least one recirculation valve operably coupled to the recirculation channel, the at least one recirculation valve capable of preventing oxygenated wastewater from flowing through the recirculation channel, and (2) a recirculation pump coupled to the recirculation channel, the pump operable to draw oxygenated wastewater through the recirculation channel.

In at least one embodiment of the oxygenator of the present disclosure, the oxygenator may be configured to be operable to convert wastewater introduced to the oxygenator through the oxygenator inlet into oxygenated wastewater containing at least about 10 mg/L of dissolved oxygen. Further, the oxygenator may be configured to be operable to cause at least about 85% of the oxygen to be dissolved into the oxygenated wastewater.

In at least one embodiment of a method for treating wastewater of the present disclosure, the method may further comprise the steps of (1) establishing a desired range for flow of wastewater into the oxygenator (an exemplary establishing step 510), (2) measuring with the controller the amount of wastewater entering the oxygenator (an exemplary measuring step 512), (3) comparing with the controller the measured amount of wastewater entering into the oxygenator to the desired range (an exemplary comparing step 514), and (4) if the controller determines in the step of comparing the measured amount that the measured amount is outside the desired range, the controller adjusts the introduction of wastewater into the oxygenator by adjusting the flow rate of the recirculation mechanism (an exemplary adjusting step 516).

In at least one embodiment of the system of the present disclosure, the system may further comprise a monitoring device capable of measuring the level of oxygen in the oxygenated wastewater, the monitoring device coupled to the oxygenator outlet and operably connected to the controller. In an exemplary embodiment of method 500, the method 500 further comprising the steps of (1) establishing the desired range for the level of oxygen in the oxygenated wastewater (an exemplary establishing step 518), (2) measuring with the monitoring device the level of oxygen in the oxygenated wastewater (an exemplary measuring step 520), (3) comparing with the controller the measured level of oxygen in the oxygenated wastewater to the desired range (an exemplary comparing step 522), and (4) if the controller determines that the measure level of oxygen in the oxygenated wastewater is outside the desired range, the controller adjusts the amount of wastewater entering the oxygenator through the wastewater inlet, the flow rate of oxygenated wastewater through the recirculation channel, and/or the amount treated fluid flowing from the oxygenator at the outlet (an exemplary adjusting step 524).

In at least one embodiment of the system of the present disclosure, the system may further comprise at least one device for collection of data related to the operation of the system and including a data storage mechanism for the data collected by the at least one device, the method further comprising the step of collecting in the data storage mechanism of the controller data collected by the at least one device during operation of the system.

EXAMPLE

Example 1

In an exemplary embodiment of a method of operating system 10 or system 40, the method may comprise
Step 1: Determine the theoretical pounds of oxygen per day (ppd) needing to be dissolved. Example 500 lbs/day;
Step 2: Calculate the oxygen supply rate based upon the cones efficiency to dissolve oxygen. Example (500 lbs/day)/85% transfer efficiency=588 lbs/day;
Step 3: Calculate the dissolved oxygen (DO) saturation level based upon the characteristics of the wastewater we are treating. Example=50 mg/L;
Step 4: Adjust the DO saturation level by applying safety factor of 0.7. Example 50 mg/L*0.7=35 mg/L;
Step 5: Calculate how much water needs to be treated. Example 588 lbs/day=35 mg/L*X*8.34 X=2 million gallons/day (MGD) or 3.11 cfs.;
Step 6: Calculate the diameter of the cone. Example Q=AV 3.11 cfs=(3.14*$r^2$)/0.20 ft/sec r=2.2 ft=Diameter=4.4 ft.; and
Step 7: Determine how many ppd of oxygen the system can dissolved based upon operating runtime. In an exemplary embodiment, cone can dissolve an oxygen flow rate of 500 ppd or 0.34 lbs/min. The system operates for 720 minutes throughout the day. 0.34 lbs/min*720 min=245 ppd.

Example 2

In an exemplary embodiment of a method of operating system 10 or system 40, the method may comprise:
Step 1: Determine the theoretical pounds of oxygen per day (ppd) needing to be dissolved. Example 500 lbs/day;
Step 2: Calculate the oxygen supply rate based upon the cones efficiency to dissolve oxygen. (The systems operating efficiency is now increased due to recirculation). Example (500 lbs/day)/90% transfer efficiency=555 lbs/day;
Step 3: Calculate the dissolved oxygen (DO) saturation level based upon the characteristics of the wastewater we are treating. Example=50 mg/L;
Step 4: Adjust the DO saturation level by applying safety factor of 0.7. Example 50 mg/L*0.7=35 mg/L;
Step 5: Calculate how much water needs to be treated. Example 555 lbs/day=35 mg/L*X*8.34 X=1.9 million gallons/day (MGD) or 2.95 cfs.;
Step 6: Calculate the diameter of the cone. Example Q=AV 2.95 cfs=(3.14*$r^2$)/0.20 ft/sec r=2.1 ft=Diameter=4.2 ft;
Step 7: Determine how many ppd of oxygen the system can dissolved based upon operating runtime (the system is now able to operate longer due to recirculation as compared to example 1). In an exemplary embodiment, the cone can dissolve an oxygen flow rate of 500 ppd or 0.34 lbs/min. The system operates for 1080 minutes throughout the day. 0.34 lbs/min*1080 min=367 ppd.

We claim:

1. A wastewater treatment system, comprising:
a wastewater inlet for receipt and flow of wastewater therethrough, the wastewater inlet having a first end and a second end, the first end of the wastewater inlet configured for fluid communication with a wastewater source;
a wastewater outlet for flow and discharge of oxygenated wastewater therethrough, the wastewater outlet having a first end and a second end, the second end of the wastewater outlet configured for fluid communication with the wastewater source;
an oxygen source;
an oxygenator operably coupled to the oxygen source to permit oxygen from the oxygen source to be introduced to the oxygenator, the oxygenator comprising an oxygenator inlet, an oxygenator outlet, and a container, the container comprising an inverse conically shaped portion configured to have a first end tapering towards a larger second end, the inlet of the oxygenator operably connected to the second end of the wastewater inlet and the first end of the container, the outlet of the oxygenator operably connected to the first end of the wastewater outlet and the second end of the container, wherein when the wastewater flows through and is oxygenated by the oxygenator, a level of dissolved oxygen in the oxygenated wastewater increases;
a recirculation mechanism comprising a recirculation channel fluidly coupled to the wastewater inlet and the wastewater outlet, wherein the recirculation channel is configured to allow oxygenated wastewater to flow therethrough; and
a controller electrically connected to the recirculation mechanism and capable of altering the flow of oxygenated wastewater through the recirculation mechanism.

2. The system of claim 1, wherein the recirculation mechanism further comprises at least one recirculation valve operably coupled to the recirculation channel, the at least one recirculation valve capable of preventing oxygenated wastewater from flowing through the recirculation channel.

3. The system of claim 1, wherein the recirculation mechanism further comprises a recirculation pump coupled to the recirculation channel, the pump operable to draw oxygenated wastewater through the recirculation channel.

4. The system of claim 1, wherein the recirculation mechanism is operable to provide a quantity of oxygenated wastewater to the oxygenator.

5. The system of claim 1, wherein the recirculation mechanism is operable to increase a flow rate of wastewater into the oxygenator.

6. The system of claim 1, wherein the recirculation mechanism is operable to increase an oxygen transfer efficiency by the system.

7. The system of claim 1, wherein the controller is further electrically connected to the oxygen source and the oxygenator, the controller capable of altering a level of oxygen delivered to the oxygenator.

8. The system of claim 1, wherein the oxygen source is operably connected to the wastewater inlet between the first and second ends of the wastewater inlet, wherein when oxygen is supplied to the wastewater inlet the oxygen flows into the oxygenator.

9. A wastewater treatment system, comprising:
a wastewater inlet for receipt and flow of wastewater therethrough, the wastewater inlet having a first end and a second end, the first end of the wastewater inlet configured for fluid communication with a wastewater source;
a wastewater outlet for flow and discharge of oxygenated wastewater therethrough, the wastewater outlet having a first end and a second end, the second end of the wastewater outlet configured for fluid communication with the wastewater source;
an oxygen source;

an oxygenator operably coupled to the oxygen source to permit oxygen from the oxygen source to be introduced to the oxygenator, the oxygenator comprising an oxygenator inlet, an oxygenator outlet, and a container, the container comprising an inverse conically shaped portion configured to have a first end tapering towards a larger second end, the inlet of the oxygenator operably connected to the second end of the wastewater inlet and the first end of the container, the outlet of the oxygenator operably connected to the first end of the wastewater outlet and the second end of the container, wherein when the wastewater flows through and is oxygenated by the oxygenator, a level of dissolved oxygen in the oxygenated wastewater increases;

a recirculation mechanism comprising:
  a recirculation channel fluidly coupled to the wastewater inlet and the wastewater outlet, wherein the recirculation channel is configured to allow oxygenated wastewater to flow therethrough;
  at least one recirculation valve operably coupled to the recirculation channel, the at least one recirculation valve capable of preventing oxygenated wastewater from flowing through the recirculation channel; and
  a recirculation pump coupled to the recirculation channel, the pump operable to draw oxygenated wastewater through the recirculation channel; and a controller electrically connected to the recirculation mechanism, the controller capable of altering the flow of oxygenated wastewater through the recirculation mechanism.

10. A method for treating wastewater, the method comprising the steps of:
  providing a system including:
    a wastewater inlet for receipt and flow of wastewater therethrough, the wastewater inlet having a first end and a second end, the first end of the wastewater inlet configured for fluid communication with a wastewater source;
    a wastewater outlet for flow and discharge of oxygenated wastewater therethrough, the wastewater outlet having a first end and a second end, the second end of the wastewater outlet configured for fluid communication with the wastewater source;
    an oxygen source;
    an oxygenator operably coupled to the oxygen source to permit oxygen from the oxygen source to be introduced to the oxygenator, the oxygenator comprising an oxygenator inlet, an oxygenator outlet, and a container, the container comprising an inverse conically shaped portion configured to have a first end tapering towards a larger second end, the oxygenator inlet operably connected to the second end of the wastewater inlet and the first end of the container, the oxygenator outlet operably connected to the first end of the wastewater outlet and the second end of the container, wherein when the wastewater flows through and is oxygenated by the oxygenator, a level of dissolved oxygen in the oxygenated wastewater increases;
    a recirculation mechanism comprising a recirculation channel fluidly coupled to the wastewater inlet and the wastewater outlet, wherein the recirculation channel is configured to allow oxygenated wastewater to flow therethrough; and
    a controller electrically connected to the oxygenator and the recirculation mechanism, the controller capable of altering the flow of oxygenated wastewater through the recirculation mechanism;

introducing wastewater into the system through the wastewater inlet;
  introducing oxygen into the system from the oxygen source;
  treating the wastewater in the system with oxygen to produce oxygenated wastewater; and
  recirculating oxygenated wastewater from the wastewater outlet to the wastewater inlet through the recirculation mechanism to further treat the oxygenated wastewater with oxygen.

11. The method of claim 10, further comprising the steps of:
  measuring an amount of oxygen present in the oxygenated wastewater; and
  adjusting, under the control of the controller, the amount of oxygen introduced into the oxygenator in response to the amount of oxygen measured as present in the oxygenated wastewater, wherein the controller is electrically connected to the oxygen source, the wastewater outlet, and the oxygenator.

12. The method of claim 10, wherein the recirculation mechanism further comprises at least one recirculation valve operably coupled to the recirculation channel, the at least one recirculation valve capable of preventing oxygenated wastewater from flowing through the recirculation channel.

13. The method of claim 10, wherein the recirculation mechanism further comprises a recirculation pump coupled to the recirculation channel, the pump operable to draw oxygenated wastewater through the recirculation channel.

14. The method of claim 10, further comprising the steps of:
  establishing a desired range for flow of wastewater into the oxygenator;
  measuring with the controller the amount of wastewater entering the oxygenator;
  comparing with the controller the measured amount of wastewater entering into the oxygenator to the desired range; and
  if the controller determines in the step of comparing the measured amount that the measured amount is outside the desired range, the controller adjusts the amount of wastewater into the oxygenator by adjusting a flow rate of the recirculation mechanism.

15. The method of claim 10, wherein the system further comprises a monitoring device capable of measuring the level of oxygen in the oxygenated wastewater, the monitoring device coupled to the oxygenator outlet and operably connected to the controller, the method further comprising the steps of:
  establishing a desired range for the level of oxygen in the oxygenated wastewater;
  measuring with the monitoring device the level of oxygen in the oxygenated wastewater;
  comparing with the controller the measured level of oxygen in the oxygenated wastewater to the desired range; and
  if the controller determines that the measure level of oxygen in the oxygenated wastewater is outside the desired range, the controller adjusts the amount of wastewater entering the oxygenator through the wastewater inlet, a flow rate of oxygenated wastewater through the recirculation channel, and/or the amount of oxygenated wastewater flowing from the oxygenator at the outlet.

16. The method of claim 10, wherein the system further comprises at least one device for collection of data related to the operation of the system and including a data storage mechanism for the data collected by the at least one device, the method further comprising the step of collecting in the data storage mechanism of a controller data collected by the at least one device during operation of the system.

\* \* \* \* \*